US012802994B2

(12) United States Patent
Yue et al.

(10) Patent No.: US 12,802,994 B2
(45) Date of Patent: Nov. 17, 2026

(54) ANODE MATERIAL WITH A SURFACE JOINED TO AN ADHESIVE, PREPARATION METHOD THEREFOR, AND USE THEREOF

(71) Applicants: CARBON ONE NEW ENERGY GROUP CO., LTD., Jiangshan Quzhou (CN); ZHEJIANG LICHEN NEW MATERIAL TECHNOLOGY CO., LTD, Huzhou (CN)

(72) Inventors: Min Yue, Jiangshan Quzhou (CN); Ning Du, Huzhou (CN); Luqi Wang, Jiangshan Quzhou (CN); Qingfu Deng, Jiangshan Quzhou (CN)

(73) Assignees: CARBON ONE NEW ENERGY GROUP CO., LTD., Jiangshan Quzhou (CN); ZHEJIANG LICHEN NEW MATERIAL TECHNOLOGY CO., LTD, Huzhou (CN)

(*) Notice: Subject to any disclaimer, the term of this patent is extended or adjusted under 35 U.S.C. 154(b) by 501 days.

(21) Appl. No.: 18/558,260

(22) PCT Filed: Jul. 19, 2023

(86) PCT No.: PCT/CN2023/108044

§ 371 (c)(1),
(2) Date: Oct. 31, 2023

(87) PCT Pub. No.: WO2024/022181

PCT Pub. Date: Feb. 1, 2024

(65) Prior Publication Data

US 2025/0096270 A1 Mar. 20, 2025

(30) Foreign Application Priority Data

Jul. 29, 2022 (CN) ......................... 202210907866.5
Jul. 29, 2022 (CN) ......................... 202210907896.6
Jul. 29, 2022 (CN) ......................... 202210907908.5
Jul. 29, 2022 (CN) ......................... 202210910405.3

(51) Int. Cl.

*H01M 4/62* (2006.01)
*C09J 129/04* (2006.01)
*H01M 4/02* (2006.01)
*H01M 4/13* (2010.01)
*H01M 4/133* (2010.01)
*H01M 4/139* (2010.01)
*H01M 4/1393* (2010.01)
*H01M 4/48* (2010.01)
*H01M 4/587* (2010.01)
*H01M 10/0525* (2010.01)

(52) U.S. Cl.

CPC ........... *H01M 4/622* (2013.01); *C09J 129/04* (2013.01); *H01M 4/13* (2013.01); *H01M 4/133* (2013.01); *H01M 4/139* (2013.01); *H01M 4/1393* (2013.01); *H01M 4/483* (2013.01); *H01M 4/587* (2013.01); *H01M 4/625* (2013.01); *H01M 10/0525* (2013.01); *C09J 2203/326* (2013.01); *H01M 2004/027* (2013.01)

(58) Field of Classification Search

None
See application file for complete search history.

(56) References Cited

U.S. PATENT DOCUMENTS

| | | | | |
|---|---|---|---|---|
| 2009/0090640 A1* | 4/2009 | Jang | ...................... | H01M 4/587 205/555 |
| 2010/0233488 A1* | 9/2010 | Sonobe | ............. | C08G 73/1014 399/329 |
| 2014/0239239 A1 | 8/2014 | Cha et al. | | |
| 2023/0327086 A1* | 10/2023 | Hayashi | ............. | H01M 10/052 |

FOREIGN PATENT DOCUMENTS

| | | |
|---|---|---|
| CN | 101884125 A | 11/2010 |
| CN | 101921380 A | 12/2010 |
| CN | 108473663 A | 8/2018 |
| CN | 109837044 A | 6/2019 |
| CN | 110364734 A | 10/2019 |
| CN | 110783559 A | 2/2020 |
| CN | 111394015 A | 7/2020 |
| CN | 111433951 A | 7/2020 |

(Continued)

OTHER PUBLICATIONS

Machine translation of CN110783559 A, published on Feb. 11, 2020 (Year: 2020).*
International Search Report and Written Opinion to corresponding application PCT/CN2023/108044 mailed on Oct. 12, 2023.
Office Action to Priority Chinese application 202210907896.6 dated Aug. 9, 2023.
Office Action to Priority Chinese application 202210907908.5 dated Aug. 9, 2023.
Office Action to Priority Chinese application 202210910405.3 dated Jul. 29, 2023.
Supplemental Search Report issued for priority Chinese Patent Application No. CN2022109104053 mailed Dec. 12, 2003.

*Primary Examiner* — Anca Eoff
(74) *Attorney, Agent, or Firm* — Sandberg Phoenix & von Gontard, PC

(57) ABSTRACT

Provided are an anode material with a surface joined to an adhesive, a preparation method therefor, and use thereof. The anode material with a surface joined to an adhesive includes the anode material and the adhesive joined to the surface of the anode material, where the adhesive includes a first polymer and a second polymer, polymerized monomers of the first polymer include any one or a combination of at least two of an acrylate monomer, an acrylamide monomer, an acrylonitrile monomer, or a styrene monomer, the second polymer is a two-component polymer, and the anode material includes any one of a silicon-carbon anode material, a silicon-oxygen anode material, an artificial graphite anode material, or a natural graphite anode material.

19 Claims, No Drawings

(56) References Cited

FOREIGN PATENT DOCUMENTS

| | | | | | |
|---|---|---|---|---|---|
| CN | 112029216 | A | | 12/2020 | |
| CN | 112226189 | A | | 1/2021 | |
| CN | 112968151 | A | | 6/2021 | |
| CN | 113270586 | A | | 8/2021 | |
| CN | 114350298 | A | | 4/2022 | |
| CN | 114583173 | A | | 6/2022 | |
| CN | 114597379 | A | | 6/2022 | |
| CN | 115799488 | A | | 3/2023 | |
| CN | 115799506 | A | | 3/2023 | |
| CN | 115799507 | A | | 3/2023 | |
| CN | 115799508 | A | | 3/2023 | |
| EP | 2755256 | A1 | * | 7/2014 | .......... H01M 50/423 |
| WO | 2022118725 | A1 | | 6/2022 | |

* cited by examiner

ANODE MATERIAL WITH A SURFACE JOINED TO AN ADHESIVE, PREPARATION METHOD THEREFOR, AND USE THEREOF

CROSS-REFERENCE TO RELATED APPLICATIONS

The present application is the US National Stage under 35 USC § 371 of International Application No. PCT/CN2023/108044, filed Jul. 19, 2023, which claims the priority to Chinese App. Nos. 202210910405.3, 202210907908.5, 202210907866.5, and 202210907896.6 all of which were filed on Jul. 29, 2022 and which are all incorporated herein by reference.

TECHNICAL FIELD

The present application belongs to the technical field of lithium-ion batteries and relates to an anode material, a preparation method therefor, and use thereof and, in particular, to an anode material with a surface joined to an adhesive, a preparation method therefor, and use thereof.

BACKGROUND

Lithium-ion batteries have been widely used in fields such as 3 C (electronic digital), energy storage, and power due to the advantages of a high energy density, a small volume, environmental friendliness, and the like. It is crucial in the industry to improve the overall performance of the lithium-ion batteries, including an energy density and a cycle life. Anode materials maturely applied at present, including natural graphite anode materials, still have some natural problems and defects, for example, poor adhesion between active substances and between the active substances and a current collector, irreversible expansion of the materials due to cycles and aging, a side reaction with an electrolyte, the aging of an SEI film, resulting in problems such as active powder fragmentation, affecting the capacity and cycle stability of a battery, and even causing potential safety hazards of the battery.

CN113270586A discloses the preparation and use of a modified silicon-based anode material coated through in-situ polymerization. A composite coating layer of an inorganic matter and a polymer is coated on the surface of a silicon-based anode material, where under the action of a deep eutectic solvent, monomers of the polymer are subjected to an in-situ polymerization reaction on the surface of the silicon-based anode material so that the composite coating layer where the inorganic matter is uniformly distributed in the polymer is obtained. The inorganic matter is a lithium salt, and the composite coating layer has a thickness of 5-15 nm. The organic-inorganic composite coating layer is constructed on the surface of the material through the in-situ polymerization of polymerizable monomers doped with the inorganic matter. The modified silicon-based anode material improves the initial coulombic efficiency of the anode material, but the cycle stability of a battery needs to be further improved.

CN110783559A discloses a modified anode material, a preparation method therefor, and use thereof. The modified anode material includes a $Si/SiO_x$-containing anode material and a polymer coating layer coated on the surface of the $Si/SiO_x$-containing anode material, wherein the polymer coating layer includes polymer colloidal particles and a reticulated high-molecular polymer. The initial coulombic efficiency of a battery can only reach 75-77%, and its cycle stability also needs to be further improved.

Therefore, a material is desired to be developed in the art that can alleviate the problems of expansion and aging of the anode material in a cycling process and increase the adhesion between the active substances and between the active substances and the current collector, thereby improving the overall performance.

SUMMARY

The following is a summary of the subject matter described in detail herein. This summary is not intended to limit the scope of the claims.

In view of the deficiencies in the related art, an object of the present application is to provide an anode material, a preparation method therefor, and use thereof, especially an anode material with a surface joined to an adhesive, a preparation method therefor, and use thereof.

To achieve the object, the present application adopts the technical solutions below.

In a first aspect, an embodiment of the present application provides an anode material with a surface joined to an adhesive. The anode material with a surface joined to an adhesive includes the anode material and the adhesive joined to the surface of the anode material, wherein the adhesive includes a first polymer and a second polymer, polymerizable monomers of the first polymer include any one or a combination of at least two of an acrylate monomer, an acrylamide monomer, an acrylonitrile monomer, or a styrene monomer, the second polymer is a two-component polymer formed by an isocyanate monomer and any one of hydroxyl-terminated butadiene-acrylonitrile rubber, a hydroxyl-terminated ethylene oxide polymer, a polyol polymer, or a hydroxyl-terminated acrylate polymer, and the anode material includes any one of a silicon-carbon anode material, a silicon-oxygen anode material, an artificial graphite anode material, or a natural graphite anode material.

In the embodiment of the present application, the first polymer has a particle structure, the second polymer has a non-particle structure, and the first polymer and the second polymer form a polymer network on the surface of the anode material.

The first polymer and the second polymer are joined to the surface of the anode material, the first polymer is an acrylate component with the particle structure and forms a spot-like structure on the surface of active substances, and the second polymer has the non-particle structure and cooperates with the first polymer to together form a polymer coating structure on the surface of the active substances so that the problems of expansion and aging of the anode material in a cycling process can be alleviated, and the adhesion between the active substances of an anode and between the active substances of the anode and a current collector can be increased, thereby improving the overall performance of the material.

In one embodiment, the acrylate monomer is selected from any one or a combination of at least two of methyl acrylate, ethyl acrylate, butyl acrylate, isobutyl acrylate, n-pentyl acrylate, isopentyl acrylate, n-hexyl acrylate, isooctyl acrylate, hydroxypropyl acrylate, 2-hydroxyethyl acrylate, lauryl acrylate, methyl methacrylate, ethyl methacrylate, butyl methacrylate, isobutyl methacrylate, n-pentyl methacrylate, n-hexyl methacrylate, isooctyl methacrylate, hydroxypropyl methacrylate, 2-hydroxyethyl methacrylate, sodium acrylate, lithium acrylate, acrylic acid, lithium methacrylate, methacrylic acid, lithium itaconate, itaconic acid, lithium monobutyl itaconate, or monobutyl itaconate.

In one embodiment, the acrylamide monomer is selected from any one or a combination of at least two of acrylamide, methacrylamide, N-hydroxymethylacrylamide, or N,N-dimethylacrylamide.

In one embodiment, the isocyanate monomer is selected from any one or a combination of at least two of toluene diisocyanate, diphenylmethane diisocyanate, 1,5-naphthalene diisocyanate, dimethylbiphenyl diisocyanate, hexamethylene diisocyanate, hexamethylene diisocyanate biuret, hexamethylene diisocyanate trimer, 2,2,4-trimethylhexamethylene diisocyanate, xylylene diisocyanate, tetramethylxylylene diisocyanate, hydrogenated xylylene diisocyanate, isophorone diisocyanate, 4,4'-dicyclohexylmethane diisocyanate, methylcyclohexane diisocyanate, 1,4-cyclohexane diisocyanate, 1,4-phenylene diisocyanate, 1,3-phenylene diisocyanate, or norbomane diisocyanate.

In the embodiment of the present application, the silicon-carbon anode material is selected from a silicon-carbon composite material based on a silicon-based material, and the silicon-oxygen anode material is a silicon-based oxide anode material $SiO_x$, wherein x is 0-2 excluding 0.

In one embodiment, the silicon-based material is nano silicon, micro silicon, porous silicon, amorphous silicon, or silicon monoxide, etc.

In one embodiment, the silicon-carbon anode material is selected from a silyl/graphite composite anode material.

In one embodiment, the silicon-carbon anode material is selected from a material prepared by compounding a Si—C composite material with natural graphite or artificial graphite.

In the embodiment of the present application, the adhesive further includes cellulose mixed with the first polymer. As a material co-mixed with the first polymer, the cellulose is mixed and wound with the first polymer so that dispersion stability of an emulsion during preparation of the first polymer and dispersion stability and a bonding force during the subsequent mixing with the active substances can be improved.

In one embodiment, the cellulose is selected from any one or a combination of at least two of cellulose acetate, methyl cellulose, ethyl cellulose, hydroxypropyl cellulose, hydroxyethyl cellulose, cellulose nitrate, carboxymethyl cellulose, carboxyethyl cellulose, carboxypropyl cellulose, carboxyisopropyl cellulose, sodium cellulose, sodium cellulose nitrate, or sodium carboxyalkyl cellulose.

In one embodiment, raw materials for preparing the second polymer further include a cross-linker and/or a catalyst.

In one embodiment, the cross-linker is selected from any one or a combination of at least two of a diol cross-linker, a triol cross-linker, a diamine cross-linker, an alcoholamine cross-linker, an alicyclic alcohol cross-linker, an aromatic alcohol cross-linker, glycerol allyl ether, glycidyl allyl ether, or dicumyl peroxide.

In one embodiment, the cross-linker is selected from any one or a combination of at least two of 1,4-butanediol, ethylene glycol, propylene glycol, diethylene glycol, neopentyl glycol, glycerol, trimethylolpropane, 3,3-dichloro-4,4-diaminodiphenylmethane, 3,5-dimethylthiotoluenediamine, 3,5-diethyltoluenediamine, 2,4-diamino-3,5-dimethylthiochlorobenzene, isophorone diamine, ethanolamine, diethanolamine, triethanolamine, N,N-bis(2-hydroxypropyl)aniline, 1,4-cyclohexanediol, hydrogenated bisphenol A, dimethylene phenyl glycol, hydroquinone bis-p-hydroxyethyl ether, resorcinol hydroxy ether, glycerol allyl ether, glycidyl allyl ether, or dicumyl peroxide.

In one embodiment, the catalyst is selected from any one or a combination of at least two of a tertiary amine catalyst or an organic metal compound.

In one embodiment, the catalyst is selected from any one or a combination of at least two of N,N-dimethylcyclohexylamine, dibutyltin dilaurate, bismuth 2-ethylhexanoate, or bismuth neodecanoate.

In the embodiment of the present application, the hydroxyl-terminated ethylene oxide polymer is a liquid hydroxyl-terminated ethylene oxide polymer, the polyol polymer is a liquid polyol polymer, and the hydroxyl-terminated acrylate polymer is a liquid hydroxyl-terminated acrylate polymer.

In one embodiment, the hydroxyl-terminated ethylene oxide polymer has a number average molecular weight of 100-10000, for example, 100, 150, 200, 300, 500, 700, 800, 900, 1000, 2000, 4000, 5000, 7000, 9000, or 10000, etc.

In one embodiment, the polyol polymer has a number average molecular weight of 100-10000, for example, 100, 150, 200, 300, 500, 700, 800, 900, 1000, 2000, 4000, 5000, 7000, 9000, or 10000, etc.

In one embodiment, the polyol polymer is selected from any one or a combination of at least two of a polyester polyol, a polyether polyol, or a polycarbonate polyol.

In one embodiment, the hydroxyl-terminated acrylate polymer has a number average molecular weight of 100-10000, for example, 100, 150, 200, 300, 500, 700, 800, 900, 1000, 2000, 4000, 5000, 7000, 9000, or 10000, etc.

In one embodiment, polymerizable monomers of the hydroxyl-terminated acrylate polymer include any one or a combination of at least two of styrene, acrylic acid, butyl acrylate, butyl methacrylate, hydroxyethyl methacrylate, hydroxyethyl acrylate, hydroxypropyl methacrylate, or hydroxypropyl acrylate.

In the embodiment of the present application, a glass transition temperature Tg of the first polymer ranges from −50° C. to 200° C., for example, −50° C., −20° C., −10° C., 0° C., 5° C., 10° C., 20° C., 50° C., 70° C., 90° C., 100° C., 130° C., 150° C., 180° C., or 200° C. Tg is tested according to differential scanning calorimetry (DSC).

In one embodiment, the first polymer has a particle size of 200 nm to 10 μm, for example, 200 nm, 400 nm, 500 nm, 800 nm, 1 μm, 3 μm, 5 μm, 8 μm, or 10 μm.

In one embodiment, the first polymer is polymerized by a method of emulsion polymerization, microemulsion polymerization, suspension polymerization, or microsuspension polymerization.

In one embodiment, the second polymer is obtained through in-situ polymerization on the surface of the anode material joined to the first polymer.

In the embodiment of the present application, the in-situ polymerization is performed on the surface of the anode material joined to the first polymer so that the isocyanate monomer and any one of the hydroxyl-terminated butadiene-acrylonitrile rubber, the hydroxyl-terminated ethylene oxide polymer, the polyol polymer, or the hydroxyl-terminated acrylate polymer are polymerized into the second polymer. Components of the second polymer are polymers with relatively good elasticity, which enhance the elasticity of the adhesive, the first polymer is the acrylate component with the particle structure and forms the spot-like structure on the surface of the active substances, and the second polymer has the non-particle structure and cooperates with the first polymer to together form the polymer coating structure on the surface of the active substances so that the problem of expansion of the anode material in volume in the cycling process can be further alleviated, and the adhesion between the active substances of the anode and between the active substances of the anode and the current collector can be further increased, thereby improving initial coulombic efficiency and cycle stability of a lithium-ion battery.

In a second aspect, an embodiment of the present application provides a preparation method for the preceding anode material with a surface joined to an adhesive. The preparation method includes:

(1) adding a first polymer and the anode material to a solvent, performing wet mixing to obtain a mixed slurry, and removing the solvent from the mixed slurry to obtain a solvent-free mixture; and (2) mixing any one of hydroxyl-terminated butadiene-acrylonitrile rubber, a hydroxyl-terminated ethylene oxide polymer, a polyol polymer, or a hydroxyl-terminated acrylate polymer, an isocyanate monomer, a cross-linker, and a catalyst, mixing the solvent-free mixture obtained in step (1), and performing an in-situ polymerization reaction to obtain the anode material with a surface joined to an adhesive.

In the embodiment of the present application, the first polymer is joined to the surface of the anode material through the wet mixing, the first polymer is an acrylate component with a particle structure and forms a spot-like structure on the surface of active substances, the isocyanate monomer and any one of the hydroxyl-terminated butadiene-acrylonitrile rubber, the hydroxyl-terminated ethylene oxide polymer, the polyol polymer, or the hydroxyl-terminated acrylate polymer are polymerized through in-situ polymerization to obtain the second polymer joined to the surface of the anode material, the second polymer has a non-particle structure, and components of the second polymer are polymers with relatively good elasticity, which enhance the elasticity of the adhesive. The wet mixing can uniformly mix high-molecular components with the active substances of an anode, which can ensure mixing uniformity.

A butadiene-acrylonitrile rubber adhesive is directly synthesized in situ on the surface of the active substances (silicon-carbon anode material), and hydrogen bonds and van der Waals forces between the adhesive and functional groups on the surface of the active substances increase an adhesion effect between the adhesive and the active substances; functional groups contained in the in-situ polymerized ethylene oxide polymer may interact with active groups on the surface of a silicon-oxygen anode material to generate chemical bonding so that a direct chemical force between the polymer structure and the silicon-oxygen anode structure is enhanced; an in-situ polymerized polyurethane adhesive is reacted and cross-linked with the first polymer, and hydrogen bonds and van der Waals forces between the adhesive and functional groups on the surface of active substances of an artificial graphite anode increase an adhesion effect between the adhesive and the active substances of the artificial graphite anode, thereby enhancing a chemical force between the polymer structure and the artificial graphite anode structure; an in-situ polymerized acrylate polymer component and a particle-type polyacrylate component of the first polymer may form a relatively good polymer network due to good compatibility so that a network coating and joining structure on the surface of natural graphite is achieved, solving the problem of relatively many defects on the surface of natural graphite, and the second polymer is directly synthesized in situ on the surface of active substances of natural graphite and hydrogen bonds and van der Waals forces between the second polymer and functional groups on the surface of the active substances increase an adhesion effect between the adhesive and the active substances of natural graphite.

The first polymer and the second polymer cooperate to together form a polymer coating structure on the surface of the active substances, and the completely synthesized adhesive exhibits a state of spheres or fiber filaments on the surface of the active substances, which is more conducive to improving adhesion.

In the embodiment of the present application, a preparation method for the first polymer in step (1) includes:

adding polymerizable monomers of the first polymer and an initiator to an aqueous solution containing an emulsifier and/or a dispersant, performing a first polymerization reaction to obtain a first polymer emulsion, and removing the solvent water to obtain the first polymer, where the polymerizable monomers of the first polymer include any one or a combination of at least two of an acrylate monomer, an acrylamide monomer, an acrylonitrile monomer, or a styrene monomer.

When the anode material is a silicon-carbon anode material or a silicon-oxygen anode material, with a total weight of the emulsifier, the dispersant, the polymerizable monomers of the first polymer, and the initiator as 100%, a total proportion of the dispersant and the emulsifier is 0.1%-20.0% (for example, 0.1%, 0.5%, 1.0%, 3.0%, 5.0%, 8.0%, 10.0%, 13.0%, 15.0%, 18.0%, or 20.0%), a proportion of the polymerizable monomers of the first polymer is 60.0%-990.8% (for example, 60.0%, 63.0%, 65.0%, 68.0%, 70.0%, 73.0%, 75.0%, 78.0%, 80.0%, 83.0%, 85.0%, 88.0%, 90.0%, 92.0%, 95.0%, 98.0%, or 99.8%), and a proportion of the initiator is 0.1%-20.0% (for example, 0.1%, 0.5%, 1.0%, 3.0%, 5.0%, 8.0%, 10.0%, 13.0%, 15.0%, 18.0%, or 20.0%).

When the anode material is an artificial graphite anode material or a natural graphite anode material, with the total weight of the emulsifier, the dispersant, the polymerizable monomers of the first polymer, and the initiator as 100%, the total proportion of the dispersant and the emulsifier is 0.1%-10.0% (for example, 0.1%, 0.5%, 1.0%, 3.0%, 5.0%, 8.0%, or 10.0%), the proportion of the polymerizable monomers of the first polymer is 80.0%-99.8% (for example, 80.0%, 83.0%, 85.0%, 88.0%, 90.0%, 92.0%, 95.0%, 98.0%, or 99.8%), and the proportion of the initiator is 0.1%-10.0% (for example, 0.1%, 0.5%, 1.0%, 3.0%, 5.0%, 8.0%, or 10.0%).

In one embodiment, a total weight percentage of the emulsifier, the dispersant, the polymerizable monomers of the first polymer, and the initiator is 2%-30% (for example, 2%, 5%, 8%, 10%, 13%, 15%, 18%, 20%, 25%, 28%, or 30%) of the first polymer emulsion.

In one embodiment, the acrylate monomer is selected from any one or a combination of at least two of methyl acrylate, ethyl acrylate, butyl acrylate, isobutyl acrylate, n-pentyl acrylate, isopentyl acrylate, n-hexyl acrylate, isooctyl acrylate, hydroxypropyl acrylate, 2-hydroxyethyl acrylate, lauryl acrylate, methyl methacrylate, ethyl methacrylate, butyl methacrylate, isobutyl methacrylate, n-pentyl methacrylate, n-hexyl methacrylate, isooctyl methacrylate, hydroxypropyl methacrylate, 2-hydroxyethyl methacrylate, sodium acrylate, lithium acrylate, acrylic acid, lithium methacrylate, methacrylic acid, lithium itaconate, itaconic acid, lithium monobutyl itaconate, or monobutyl itaconate.

In one embodiment, the acrylamide monomer is selected from any one or a combination of at least two of acrylamide, methacrylamide, N-hydroxymethylacrylamide, or N,N-dimethylacrylamide.

In one embodiment, the emulsifier is one or a combination of at least two of sodium dodecyl sulfate, sodium dodecyl benzenesulfonate, or sodium dodecyl sulfonate.

In one embodiment, the dispersant is one or a combination of at least two of polyvinyl alcohol, polyvinylpyrrolidone, tetradecane, hexadecane, or octadecane.

In one embodiment, the initiator is independently an organic peroxide initiator, an organic azo initiator, an inorganic peroxide initiator, or a redox initiator.

In one embodiment, the organic peroxide initiator is benzoyl peroxide or dicumyl peroxide.

In one embodiment, the organic azo initiator is azobisisobutyronitrile or azobisisoheptanonitrile.

In one embodiment, the inorganic peroxide initiator is ammonium persulfate, sodium persulfate, or potassium persulfate.

In one embodiment, the redox initiator is ammonium persulfate and sodium sulfite, or ammonium persulfate and sodium bisulfite.

In one embodiment, the first polymerization reaction is performed at a temperature of 35-98° C., for example, 35° C., 40° C., 50° C., 55° C., 60° C., 65° C., 68° C., 70° C., 75° C., 80° C., 85° C., 90° C., 95° C., or 98° C.

In one embodiment, the first polymerization reaction is performed for 3-15 h, for example, 3 h, 4 h, 5 h, 6 h, 7 h, 8 h, 9 h, 10 h, 12 h, or 15 h.

In the embodiment of the present application, with a total weight of a first adhesive and the anode material in the mixed slurry in step (1) as 100%, a proportion of the first adhesive is 0.5-10.0% (for example, 0.5%, 1.0%, 2.0%, 3.0%, 5.0%, 7.0%, 9.0%, or 10.0%) and a proportion of the anode material is 90.0-99.5% (for example, 90.0%, 92.0%, 94.0%, 95.0%, 97.0%, 99.0%, or 99.5%).

In one embodiment, the mixed slurry in step (1) further includes a conductive additive.

In one embodiment, the conductive additive includes one or a combination of at least two of conductive graphite, acetylene black, carbon nanotubes, or conductive carbon black.

In one embodiment, with the total weight of the first adhesive and the anode material in the mixed slurry in step (1) as 100%, a proportion of the conductive additive is 0-5%, for example, 0.5%, 1.0%, 1.5%, 2.0%, 3.0%, 4.0%, or 5.0%.

In one embodiment, a process of the wet mixing in step (1) includes a resonant sound mixing process, a high shear process, and a grinding process.

In one embodiment, the wet mixing in step (1) is performed by one or a combination of at least two of a ball mill, an electromagnetic ball mill, a disc mill, a pin grinder, a high energy impact grinder, a fluid energy impact grinder, a counter-jet grinder, a fluidized-bed jet grinder, a hammer grinder, or an impact grinder.

In one embodiment, a method for removing the solvent from the mixed slurry in step (1) is any one or a combination of at least two of vacuum drying, centrifugation, freeze drying, or spray drying.

In the embodiment of the present application, when the anode material is any one of the silicon-oxygen anode material, the artificial graphite anode material, or the natural graphite anode material, cellulose is further added to a system of the first polymerization reaction.

In one embodiment, the cellulose is selected from any one or a combination of at least two of cellulose acetate, methyl cellulose, ethyl cellulose, hydroxypropyl cellulose, hydroxyethyl cellulose, cellulose nitrate, carboxymethyl cellulose, carboxyethyl cellulose, carboxypropyl cellulose, carboxyisopropyl cellulose, sodium cellulose, sodium cellulose nitrate, or sodium carboxyalkyl cellulose.

In one embodiment, the cellulose is used in an amount of 0.1%-5.0% (for example, 0.1%, 0.3%, 0.5%, 0.8%, 1.0%, 2.0%, 3.0%, 4.0%, or 5.0%) of a total weight of the polymerizable monomers of the first polymer.

In the embodiment of the present application, a total weight of the isocyanate monomer and any one of the hydroxyl-terminated butadiene-acrylonitrile rubber, the hydroxyl-terminated ethylene oxide polymer, the polyol polymer, or the hydroxyl-terminated acrylate polymer in step (2) is 0.1-10.0% (for example, 0.1%, 0.5%, 1.0%, 2.0%, 3.0%, 4.0%, 5.0%, 6.0%, 7.0%, 8.0%, 9.0%, or 10.0%) of a weight of the solvent-free mixture.

In one embodiment, a weight ratio of the isocyanate monomer to any one of the hydroxyl-terminated butadiene-acrylonitrile rubber, the hydroxyl-terminated ethylene oxide polymer, the polyol polymer, or the hydroxyl-terminated acrylate polymer in step (2) is 1:2-5:1, for example, 1:2, 1:1, 1.5:1, 1.8:1, 2:1, 2.5:1, 3:1, 3.5:1, 4:1, 4.5:1, or 5:1.

In one embodiment, in step (2), the cross-linker is used in an amount of 0.1%-10.0% (for example, 0.1%, 0.5%, 1.0%, 2.0%, 3.0%, 4.0%, 5.0%, 6.0%, 7.0%, 8.0%, 9.0%, or 10.0%) of the total weight of the isocyanate monomer and any one of the hydroxyl-terminated butadiene-acrylonitrile rubber, the hydroxyl-terminated ethylene oxide polymer, the polyol polymer, or the hydroxyl-terminated acrylate polymer.

In one embodiment, in step (2), the catalyst is used in an amount of 0.1%-5.0% (for example, 0.1%, 0.5%, 1.0%, 2.0%, 3.0%, 4.0%, or 5.0%) of the total weight of the isocyanate monomer and any one of the hydroxyl-terminated butadiene-acrylonitrile rubber, the hydroxyl-terminated ethylene oxide polymer, the polyol polymer, or the hydroxyl-terminated acrylate polymer.

In one embodiment, the isocyanate monomer in step (2) is selected from any one or a combination of at least two of toluene diisocyanate, diphenylmethane diisocyanate, 1,5-naphthalene diisocyanate, dimethylbiphenyl diisocyanate, hexamethylene diisocyanate, hexamethylene diisocyanate biuret, hexamethylene diisocyanate trimer, 2,2,4-trimethylhexamethylene diisocyanate, xylylene diisocyanate, tetramethylxylylene diisocyanate, hydrogenated xylylene diisocyanate, isophorone diisocyanate, 4,4'-dicyclohexylmethane diisocyanate, methylcyclohexane diisocyanate, 1,4-cyclohexane diisocyanate, 1,4-phenylene diisocyanate, 1,3-phenylene diisocyanate, or norbornane diisocyanate.

In one embodiment, the cross-linker in step (2) is selected from any one or a combination of at least two of a diol cross-linker, a triol cross-linker, a diamine cross-linker, an alcoholamine cross-linker, an alicyclic alcohol cross-linker, an aromatic alcohol cross-linker, glycerol allyl ether, glycidyl allyl ether, or dicumyl peroxide.

In one embodiment, the cross-linker in step (2) is selected from any one or a combination of at least two of 1,4-butanediol, ethylene glycol, propylene glycol, diethylene glycol, neopentyl glycol, glycerol, trimethylolpropane, 3,3-dichloro-4,4-diaminodiphenylmethane, 3,5-dimethylthiotoluenediamine, 3,5-diethyltoluenediamine, 2,4-diamino-3,5-dimethylthiochlorobenzene, isophorone diamine, ethanolamine, diethanolamine, triethanolamine, N,N-bis(2-hydroxypropyl)aniline, 1,4-cyclohexanediol, hydrogenated bisphenol A, dimethylene phenyl glycol, hydroquinone bis-p-hydroxyethyl ether, resorcinol hydroxy ether, glycerol allyl ether, glycidyl allyl ether, or dicumyl peroxide.

In one embodiment, in step (2), the hydroxyl-terminated ethylene oxide polymer is a liquid hydroxyl-terminated ethylene oxide polymer, the polyol polymer is a liquid polyol polymer, and the hydroxyl-terminated acrylate polymer is a liquid hydroxyl-terminated acrylate polymer.

In one embodiment, the hydroxyl-terminated ethylene oxide polymer has a number average molecular weight of 100-10000.

In one embodiment, the polyol polymer has a number average molecular weight of 100-10000.

In one embodiment, the polyol polymer is selected from any one or a combination of at least two of a polyester polyol, a polyether polyol, or a polycarbonate polyol.

In one embodiment, the hydroxyl-terminated acrylate polymer has a number average molecular weight of 100-10000.

In one embodiment, polymerizable monomers of the hydroxyl-terminated acrylate polymer include any one or a combination of at least two of styrene, acrylic acid, butyl acrylate, butyl methacrylate, hydroxyethyl methacrylate, hydroxyethyl acrylate, hydroxypropyl methacrylate, or hydroxypropyl acrylate.

In one embodiment, the catalyst in step (2) is selected from any one or a combination of at least two of a tertiary amine catalyst or an organic metal compound.

In one embodiment, the catalyst in step (2) is selected from any one or a combination of at least two of N,N-dimethylcyclohexylamine, dibutyltin dilaurate, bismuth 2-ethylhexanoate, or bismuth neodecanoate.

In one embodiment, the in-situ polymerization reaction in step (2) is performed at a temperature of 25-100° C., for example, 25° C., 30° C., 33° C., 35° C., 40° C., 45° C., 50° C., 55° C., 60° C., 65° C., 70° C., 75° C., 80° C., 85° C., 90° C., 95° C., or 100° C.

In one embodiment, the in-situ polymerization reaction in step (2) is performed for 5-50 h, for example, 5 h, 10 h, 15 h, 20 h, 24 h, 28 h, 30 h, 36 h, 39 h, 40 h, 42 h, 45 h, 48 h, or 50 h.

In a third aspect, an embodiment of the present application provides an anode sheet including the preceding anode material with a surface joined to an adhesive.

In a fourth aspect, an embodiment of the present application provides an electrochemical energy storage device including the preceding anode material with a surface joined to an adhesive.

In one embodiment, the electrochemical energy storage device is selected from one of a lithium-ion battery, a sodium-ion battery, a supercapacitor, a fuel cell, or a solar cell.

Compared with the related art, the present application has the beneficial effects below.

The adhesive including the first polymer and the second polymer is joined to the surface of the anode material so that the problems of expansion and aging of the anode material in the cycling process are alleviated, and the adhesion between the active substances of the anode and between the active substances of the anode and the current collector can be increased, thereby improving the overall performance of the material. Thus, the lithium-ion battery containing the anode material with a surface joined to an adhesive has high initial coulombic efficiency and cycle stability.

DETAILED DESCRIPTION

Technical solutions of the present application are further described below through specific examples. Those skilled in the art are to understand that the examples described herein are used for a better understanding of the present application and are not to be construed as specific limitations to the present application.

Examples 1 to 11, Comparative Examples 1 to 4, Application Examples 1 to 11, and Comparative Application Examples 1 to 4 provide a silicon-carbon anode material with a surface joined to an adhesive and an anode sheet prepared therefrom.

Example 1

This example provides a silicon-carbon anode material with a surface joined to an adhesive, and a preparation method therefor includes the steps below.

(1) An aqueous solution (800 g) where 5 g of polyvinyl alcohol (PVA) was dispersed was placed in a 2000 L reaction kettle, in a state of stirring at a rotational speed of 250 rpm, nitrogen with a purity of ≥99.9% was introduced, first polymerizable monomers including 100 g of methyl acrylate, 10 g of acrylamide monomer, and 10 g of acrylonitrile were added, and 0.5 g of azobisisobutyronitrile (AIBN) was added as an initiator, continuously stirred and continuously introduced with nitrogen, the solution was heated to 75° C., a first polymerization reaction was performed for 5 h to obtain a polymerization product, the polymerization product was depressurized with a vacuum pump to a vacuum degree lower than 0.1 MPa, and residual unreacted monomer components were removed to obtain a first polymer.

(2) 98 parts by weight of the silicon-carbon anode material (SiC with a capacity of 1350 mAh/g) and 2 parts by weight of the first polymer were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 3 g of hexamethylene diisocyanate and 4 g of hydroxyl-terminated butadiene-acrylonitrile rubber (TL55 from Jingjiang Tonggao Chemical Co., Ltd.), which were subjected to water removal, were added together to a mixing bowl, 0.5 g of 1,4-butanediol was added as a cross-linker, 0.05 g of N,N-dimethylcyclohexylamine was added as a catalyst, and these materials were mixed at 2000 rpm for 10 min in a defoamer to obtain a mixture. 1 part by weight of the mixture and 99 parts by weight of the solvent-free mixture obtained in step (2) were mixed at 2000 rpm for 10 min in the defoamer. An in-situ polymerization reaction was performed after standing at normal temperature for 12 h until the adhesive was cured, and the obtained product was ground into fine powder with a mortar to obtain the silicon-carbon anode material with a surface joined to an adhesive.

Example 2

This example provides a silicon-carbon anode material with a surface joined to an adhesive, and a preparation method therefor includes the steps below.

(1) An aqueous solution (800 g) where 5 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 60 g of methyl acrylate, 10 g of acrylamide monomer, and 20 g of acrylonitrile were added, and 0.5 g of azobisisobutyronitrile (AIBN) was added as an initiator, continuously stirred and continuously introduced with nitrogen, the solution was heated to 75° C., the first polymerization reaction was performed for 5 h to obtain a polymerization product, the polymerization product was depressurized with a vacuum pump to a vacuum degree lower than 0.1 MPa, and residual unreacted monomer components were removed to obtain a first polymer.

(2) 90 parts by weight of the silicon-carbon anode material (SiC with a capacity of 1350 mAh/g) and 10 parts by weight of the first polymer were added to a metered amount of deionized water to prepare a dispersion slurry with a solid content of 45%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5 g of toluene diisocyanate and 4 g of hydroxyl-terminated butadiene-acrylonitrile rubber (TL55 from Jingjiang Tonggao Chemical Co., Ltd.), which were subjected to water removal, were added together to a mixing bowl, 0.5 g of 1,4-butanediol was added as a cross-linker, 0.02 g of dibutyltin dilaurate was added as a catalyst, and these materials were mixed at 2000 rpm for 10 min in a defoamer to obtain a mixture. 1 part by weight of the mixture and 99 parts by weight of the solvent-free mixture obtained in step (2) were mixed at 2000 rpm for 10 min in the defoamer. A reaction was performed after standing at normal temperature for 12 h until the adhesive was cured, and the obtained product was ground into fine powder with a mortar to obtain the silicon-carbon anode material with a surface joined to an adhesive.

Example 3

This example provides a silicon-carbon anode material with a surface joined to an adhesive, and a preparation method therefor includes the steps below.

(1) An aqueous solution (800 g) where 8 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 50 g of methyl acrylate, 20 g of acrylamide monomer, and 10 g of acrylonitrile were added, and 0.5 g of azobisisobutyronitrile (AIBN) was added as an initiator, continuously stirred and continuously introduced with nitrogen, the solution was heated to 80° C., the first polymerization reaction was performed for 10 h to obtain a polymerization product, the polymerization product was depressurized with a vacuum pump to a vacuum degree lower than 0.1 MPa, and residual unreacted monomer components were removed to obtain a first polymer.

(2) 99 parts by weight of the silicon-carbon material (SiC with a capacity of 1350 mAh/g), 0.5 parts by weight of the first polymer, and 0.5 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5 g of tetramethylxylylene diisocyanate and 4.5 g of hydroxyl-terminated butadiene-acrylonitrile rubber (TL55 from Jingjiang Tonggao Chemical Co., Ltd.), which were subjected to water removal, were added together to a mixing bowl, 0.6 g of isophorone diamine was added as a cross-linker, 0.02 g of bismuth 2-ethylhexanoate was added as a catalyst, and these materials were mixed at 2000 rpm for 10 min in a defoamer to obtain a mixture. 5 parts by weight of the mixture and 95 parts by weight of the solvent-free mixture obtained in step (2) were mixed at 2000 rpm for 10 min in the defoamer. A reaction was performed after standing at normal temperature for 24 h until the adhesive was cured, and the obtained product was ground into fine powder with a mortar to obtain the silicon-carbon anode material with a surface joined to an adhesive.

Example 4

This example provides a silicon-carbon anode material with a surface joined to an adhesive, and a preparation method therefor includes the steps below.

(1) An aqueous solution (800 g) where 2 g of polyvinyl alcohol (PVA) and 3 g of sodium dodecyl benzenesulfonate were dispersed was placed in a 2000 L reaction kettle, in a state of stirring at a rotational speed of 250 rpm, nitrogen with a purity of ≥99.9% was introduced, monomers of a first polymerization reaction including 100 g of methyl acrylate, 10 g of acrylamide monomer, and 10 g of acrylonitrile were added, and 0.5 g of azobisisobutyronitrile (AIBN) was added as an initiator, continuously stirred and continuously introduced with nitrogen, the solution was heated to 95° C., the first polymerization reaction was performed for 3 h to obtain a polymerization product, the polymerization product was depressurized with a vacuum pump to a vacuum degree lower than 0.1 MPa, and residual unreacted monomer components were removed to obtain a first polymer.

(2) 90 parts by weight of the silicon-carbon material (SiC with a capacity of 1350 mAh/g), 8 parts by weight of the first polymer, and 2 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 7.5 g of 4,4'-dicyclohexylmethane diisocyanate and 6 g of hydroxyl-terminated butadiene-acrylonitrile rubber (TL55 from Jingjiang Tonggao Chemical Co., Ltd.), which were subjected to water removal, were added together to a mixing bowl, 2 g of glycerol was added as a cross-linker, 0.03 g of bismuth neodecanoate was added as a catalyst, and these materials were mixed at 2000 rpm for 10 min in a defoamer to obtain a mixture. 0.5 parts by weight of the mixture and 99.5 parts by weight of the solvent-free mixture obtained in step (2) were mixed at 2000 rpm for 10 min in the defoamer. A reaction was performed after standing at normal temperature for 5 h until the adhesive was cured, and the obtained product was ground into fine powder with a mortar to obtain the silicon-carbon anode material with a surface joined to an adhesive.

Example 5

This example provides a silicon-carbon anode material with a surface joined to an adhesive, and a preparation method therefor includes the steps below.

(1) An aqueous solution (800 g) where 2 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 100 g of methyl acrylate, 20 g of acrylamide monomer, and 10 g of acrylonitrile were added, and 0.5 g of azobisisobutyronitrile (AIBN) was added as an initiator, continuously stirred and continuously introduced with nitrogen, the solution was heated to 50° C., the first polymerization reaction was performed for 15 h to obtain a polymerization product, the polymerization product was depressurized with a vacuum pump to a vacuum degree lower than 0.1 MPa, and residual unreacted monomer components were removed to obtain a first polymer.

(2) 99 parts by weight of the silicon-carbon material (SiC with a capacity of 1350 mAh/g), 0.5 parts by weight of the first polymer, and 0.5 parts by weight of conductive carbon black were added to a metered amount of deionized water to prepare a dispersion slurry with a solid content of 45%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5 g of isophorone diisocyanate and 5.5 g of hydroxyl-terminated butadiene-acrylonitrile rubber (TL55 from Jingjiang Tonggao Chemical Co., Ltd.), which were subjected to water removal, were added together to a mixing bowl, 0.5 g of dimethylene phenyl glycol was added as a cross-linker, 0.01 g of bismuth 2-ethylhexanoate was added as a catalyst, and these materials were mixed at 2000 rpm for 10 min in a defoamer to obtain a mixture. 10 parts by weight of the mixture and 90 parts by weight of the solvent-free mixture obtained in step (2) were mixed at 2000 rpm for 10 min in the defoamer. A reaction was performed after standing at 40° C. for 30 h until the adhesive was cured, and the obtained product was ground into fine powder with a mortar to obtain the silicon-carbon anode material with a surface joined to an adhesive.

Example 6

This example provides a silicon-carbon anode material with a surface joined to an adhesive, and a preparation method therefor includes the steps below.

(1) An aqueous solution (800 g) where 5 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 80 g of methyl acrylate, 20 g of acrylamide monomer, and 5 g of acrylonitrile were added, and 0.5 g of azobisisobutyronitrile (AIBN) was added as an initiator, continuously stirred and continuously introduced with nitrogen, the solution was heated to 75° C., the first polymerization reaction was performed for 8 h to obtain a polymerization product, the polymerization product was depressurized with a vacuum pump to a vacuum degree lower than 0.1 MPa, and residual unreacted monomer components were removed to obtain a first polymer.

(2) 93 parts by weight of the silicon-carbon material (SiC with a capacity of 1350 mAh/g), 2 parts by weight of the first polymer, and 5 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.5 g of 1,5-naphthalene diisocyanate and 6.5 g of hydroxyl-terminated butadiene-acrylonitrile rubber (TL55 from Jingjiang Tonggao Chemical Co., Ltd.), which were subjected to water removal, were added together to a mixing bowl, 0.6 g of 3,5-diethyltoluenediamine was added as a cross-linker, 0.01 g of dibutyltin dilaurate was added as a catalyst, and these materials were mixed at 2000 rpm for 10 min in a defoamer to obtain a mixture. 10 parts by weight of the mixture and 90 parts by weight of the solvent-free mixture obtained in step (2) were mixed at 2000 rpm for 10 min in the defoamer. A reaction was performed after standing at 100° C. for 5 h until the adhesive was cured, and the obtained product was ground into fine powder with a mortar to obtain the silicon-carbon anode material with a surface joined to an adhesive.

Example 7

This example differs from Example 1 only in that the monomers of the first polymerization reaction in step (1) included only 109 g of methyl acrylate and 11 g of acrylamide monomer.

Example 8

This example differs from Example 1 only in that the monomers of the first polymerization reaction in step (1) included only 109 g of methyl acrylate and 11 g of acrylonitrile.

Example 9

This example differs from Example 1 only in that the monomers of the first polymerization reaction in step (1) included only 120 g of methyl acrylate.

Example 10

This example differs from Example 1 only in that the monomers of the first polymerization reaction in step (1) included only 120 g of acrylamide monomer.

Example 11

This example differs from Example 1 only in that the monomers of the first polymerization reaction in step (1) included only 120 g of acrylonitrile.

Comparative Example 1

This comparative example differs from Example 1 only in that the monomers of the first polymerization reaction in step (1) were replaced with 100 g of styrene, 10 g of acrylamide monomer, and 10 g of acrylonitrile.

Comparative Example 2

This comparative example differs from Example 1 only in that the hydroxyl-terminated butadiene-acrylonitrile rubber in step (3) was replaced with a hydroxyl-terminated ethylene oxide polymer (TT300 from Tiantai Chemical).

Comparative Example 3

This comparative example differs from Example 1 only in that in-situ polymerization in step (3) was not performed, and the solvent-free mixture obtained in step (2) was directly used as the silicon-carbon anode material with a surface joined to an adhesive.

Comparative Example 4

This comparative example provides a modified silicon-carbon anode material, and a preparation method therefor includes the steps below.

3 g of hexamethylene diisocyanate and 4 g of hydroxyl-terminated butadiene-acrylonitrile rubber (TL55 from Jingjiang Tonggao Chemical Co., Ltd.), which were subjected to water removal, were added together to a mixing bowl, 0.5 g of 1,4-butanediol was added as a cross-linker, 0.05 g of N,N-dimethylcyclohexylamine was added as a catalyst, and these materials were mixed at 2000 rpm for 10 min in a defoamer to obtain a mixture. 1 part by weight of the mixture and 99 parts by weight of a silicon-carbon material were mixed at 2000 rpm for 10 min in the defoamer. An in-situ polymerization reaction was performed after standing at normal temperature for 12 h until an adhesive was cured, and the obtained product was ground into fine powder with a mortar to obtain the modified silicon-carbon anode material.

Application Examples 1 to 11 and Comparative Application Examples 1 to 4

The silicon-carbon anode materials prepared above were prepared into anode sheets. Specifically, the silicon-carbon anode materials obtained in Examples 1 to 11 and Comparative Examples 1 to 4 were each mixed with a conductive agent carbon black (Surper P) and an adhesive PAA at a mass ratio of 85:5:10 to obtain a slurry, and the slurry was coated on a copper foil to form an anode sheet.

The prepared anode sheet and a lithium metal electrode sheet were assembled into a lithium-ion button battery. $LiPF_6$ was dissolved at a concentration of 1 mol/L in an electrolyte containing ethylene carbonate/diethyl carbonate/ethyl methyl carbonate (EC/DEC/EMC)=2:3:1. After the button battery was assembled, initial coulombic efficiency and cycles were tested according to the following steps: standing for 2 h; constant current discharging at 0.1 C to 0.005 V, at 0.08 C to 0.001 V, at 0.05 C to 0.001 V, and at 0.02 C to 0.001 V; standing for 10 min; constant current charging at 0.1 C to 1.5 V.

The test results of the initial coulombic efficiency and the cycles are shown in Table 1.

TABLE 1

| Name | Ratio of the Slurry of the Anode Sheet | Initial coulombic efficiency (%) | Capacity Retention Rate After 1000 Cycles (%) |
|---|---|---|---|
| Application Example 1 | Silicon-carbon anode material:SP:adhesive = 85:5:10 | 91.5 | 81.1 |
| Application Example 2 | Silicon-carbon anode material:SP:adhesive = 85:5:10 | 90.4 | 81.5 |
| Application Example 3 | Silicon-carbon anode material:SP:adhesive = 85:5:10 | 91.2 | 82.2 |
| Application Example 4 | Silicon-carbon anode material:SP:adhesive = 85:5:10 | 91.8 | 80.8 |
| Application Example 5 | Silicon-carbon anode material:SP:adhesive = 85:5:10 | 91.0 | 80.9 |
| Application Example 6 | Silicon-carbon anode material:SP:adhesive = 85:5:10 | 90.6 | 81.9 |
| Application Example 7 | Silicon-carbon anode material:SP:adhesive = 85:5:10 | 90.1 | 81.7 |
| Application Example 8 | Silicon-carbon anode material:SP:adhesive = 85:5:10 | 90.6 | 82.6 |
| Application Example 9 | Silicon-carbon anode material:SP:adhesive = 85:5:10 | 91.1 | 82.2 |
| Application Example 10 | Silicon-carbon anode material:SP:adhesive = 85:5:10 | 91.0 | 81.1 |
| Application Example 11 | Silicon-carbon anode material:SP:adhesive = 85:5:10 | 91.5 | 81.8 |
| Comparative Application Example 1 | Silicon-carbon anode material:SP:adhesive = 85:5:10 | 85.3 | 50.5 |
| Comparative Application Example 2 | Silicon-carbon anode material:SP:adhesive = 85:5:10 | 84.2 | 52.5 |
| Comparative Application Example 3 | Silicon-carbon anode material:SP:adhesive = 85:5:10 | 81.0 | 59.5 |
| Comparative Application Example 4 | Silicon-carbon anode material:SP:adhesive = 85:5:10 | 80.0 | 57.4 |

As can be seen from the results in Table 1, the silicon-carbon anode material with a surface Joined to an adhesive of the present application can cause the battery using the same to reach a initial coulombic efficiency of 90% or above and a capacity retention rate of 80% or above after 1000 cycles and have high initial coulombic efficiency and cycle stability.

In Comparative Example 1, after the first polymer obtained through the polymerization of styrene, the acrylamide monomer, and acrylonitrile was used for modifying the silicon-carbon material, since the styrene component has weaker adhesion and a weaker bonding force than the acrylate monomer on the surface of active substances, the battery has reduced initial coulombic efficiency and greatly reduced cycle stability.

In Comparative Example 2, the hydroxyl-terminated butadiene-acrylonitrile rubber was replaced with the hydroxyl-terminated ethylene oxide polymer in a second polymer. Since the epoxy structure has poorer elasticity than the rubber structure, the expansion in volume in a cycling process cannot be effectively alleviated, and thus the battery has reduced initial coulombic efficiency and greatly reduced cycle stability.

In Comparative Example 3, since the in-situ polymerization in step (3) was not performed, the adhesive in the obtained silicon-carbon anode material with a surface joined to an adhesive includes only the first polymer. In Comparative Example 4, the adhesive in the obtained silicon-carbon anode material with a surface joined to an adhesive includes only the second polymer. Therefore, a good polymer coating network structure cannot be formed, and thus the batteries in Comparative Examples 3 and 4 have reduced initial coulombic efficiency and greatly reduced cycle stability.

Examples 12 to 26, Comparative Examples 5 to 7, Application Examples 12 to 26, and Comparative Application Examples 5 to 7 provide a silicon-oxygen anode material with a surface joined to an adhesive and an anode sheet prepared therefrom.

Example 12

This example provides a silicon-oxygen anode material with a surface joined to an adhesive, and a preparation method therefor includes the steps below.

(1) An aqueous solution (800 g) where 5 g of polyvinyl alcohol (PVA) was dispersed was placed in a 2000 L reaction kettle, in a state of stirring at a rotational speed of 250 rpm, nitrogen with a purity of ≥99.9% was introduced, first polymerizable monomers including 100 g of methyl acrylate, 10 g of acrylamide monomer, and 10 g of acrylonitrile were added, and 0.5 g of AIBN was added as an initiator, continuously stirred and continuously introduced with nitrogen, the solution was heated to 75° C., a first polymerization reaction was performed for 5 h to obtain a polymerization product, the polymerization product was depressurized with a vacuum pump to a vacuum degree lower than 0.1 MPa, and residual unreacted monomer components were removed to obtain a first polymer.

(2) 98 parts by weight of the silicon-oxygen anode material (SiO with a capacity of 1600 mAh/g) and 2 parts by weight of the first polymer were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5 g of hexamethylene diisocyanate and 4 g of a hydroxyl-terminated ethylene oxide polymer (TT310 from Tiantai Chemical), which were subjected to water removal, were added together to a mixing bowl, 0.3 g of 1,4-butanediol was added as a cross-linker, 0.01 g of dibutyltin dilaurate was added as a catalyst, and these materials were mixed at 2000 rpm for 10 min in a defoamer to obtain a mixture. 1 part by weight of the mixture and 99 parts by weight of the solvent-free mixture obtained in step (2) were mixed at 2000 rpm for 10 min in the defoamer. An in-situ polymerization reaction was performed after standing at normal temperature for 12 h until the adhesive was cured, and the obtained product was ground into fine powder with a mortar to obtain the silicon-oxygen anode material with a surface joined to an adhesive.

Example 13

This example provides a silicon-oxygen anode material with a surface joined to an adhesive, and a preparation method therefor includes the steps below.

(1) An aqueous solution (800 g) where 5 g of polyvinyl alcohol (PVA) was dispersed was placed in a 2000 L reaction kettle, in a state of stirring at a rotational speed of 250 rpm, nitrogen with a purity of ≥99.9% was introduced, first polymerizable monomers including 50 g of methyl acrylate, 10 g of acrylamide monomer, 20 g of acrylonitrile, and 10 g of styrene were added, and 0.5 g of AIBN was added as an initiator, continuously stirred and continuously introduced with nitrogen, the solution was heated to 80° C., a first polymerization reaction was performed for 8 h to obtain a polymerization product, the polymerization product was depressurized with a vacuum pump to a vacuum degree lower than 0.1 MPa, and residual unreacted monomer components were removed to obtain a first polymer.

(2) 90 parts by weight of the silicon-oxygen anode material (SiO with a capacity of 1600 mAh/g) and 10 parts by weight of the first polymer were added to a metered amount of deionized water to prepare a dispersion slurry with a solid content of 45%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5 g of toluene diisocyanate and 4 g of a hydroxyl-terminated ethylene oxide polymer (TT310 from Tiantai Chemical), which were subjected to water removal, were added together to a mixing bowl, 0.3 g of 1,4-butanediol was added as a cross-linker, 0.02 g of dibutyltin dilaurate was added as a catalyst, and these materials were mixed at 2000 rpm for 10 min in a defoamer to obtain a mixture. 1 part by weight of the mixture and 99 parts by weight of the solvent-free mixture obtained in step (2) were mixed at 2000 rpm for 10 min in the defoamer. A reaction was performed after standing at normal temperature for 12 h until the adhesive was cured, and the obtained product was ground into fine powder with a mortar to obtain the silicon-oxygen anode material with a surface joined to an adhesive.

Example 14

This example provides a silicon-oxygen anode material with a surface joined to an adhesive, and a preparation method therefor includes the steps below.

(1) An aqueous solution (800 g) where 8 g of polyvinyl alcohol (PVA) was dispersed was placed in a 2000 L reaction kettle, in a state of stirring at a rotational speed of 250 rpm, nitrogen with a purity of ≥99.9% was introduced, first polymerizable monomers including 50 g of methyl acrylate, 20 g of acrylamide monomer, 10 g of acrylonitrile, and 5 g of styrene were added, and 0.5 g of AIBN was added as an initiator, continuously stirred and continuously introduced with nitrogen, the solution was heated to 80° C., a first polymerization reaction was performed for 10 h to obtain a polymerization product, the polymerization product was depressurized with a vacuum pump to a vacuum degree lower than 0.1 MPa, and residual unreacted monomer components were removed to obtain a first polymer.

(2) 99 parts by weight of the silicon-oxygen anode material (SiO with a capacity of 1600 mAh/g), 0.5 parts by weight of the first polymer, and 0.5 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5 g of tetramethylxylylene diisocyanate and 4.5 g of a hydroxyl-terminated ethylene oxide polymer (TT310 from Tiantai Chemical), which were subjected to water removal, were added together to a mixing bowl, 0.6 g of 1,4-butanediol was added as a cross-linker, 0.02 g of bismuth 2-ethylhexanoate was added as a catalyst, and these materials were mixed at 2000 rpm for 10 min in a defoamer to obtain a mixture. 5 parts by weight of the mixture and 95 parts by weight of the solvent-free mixture obtained in step (2) were mixed at 2000 rpm for 10 min in the defoamer. A reaction was performed after standing at normal temperature for 24 h until the adhesive was cured, and the obtained product was ground into fine powder with a mortar to obtain the silicon-oxygen anode material with a surface joined to an adhesive.

Example 15

This example provides a silicon-oxygen anode material with a surface joined to an adhesive, and a preparation method therefor includes the steps below.

(1) An aqueous solution (800 g) where 2 g of polyvinyl alcohol (PVA) and 3 g of sodium dodecyl benzenesulfonate were dispersed was placed in a 2000 L reaction kettle, in a state of stirring at a rotational speed of 250 rpm, nitrogen with a purity of ≥99.9% was introduced, first polymerizable monomers including 100 g of methyl acrylate, 10 g of acrylamide monomer, 10 g of acrylonitrile, and 10 g of styrene were added, and 0.5 g of AIBN was added as an initiator, continuously stirred and continuously introduced with nitrogen, the solution was heated to 95° C., a first polymerization reaction was performed for 3 h to obtain a polymerization product, the polymerization product was depressurized with a vacuum pump to a vacuum degree lower than 0.1 MPa, and residual unreacted monomer components were removed to obtain a first polymer.

(2) 90 parts by weight of the silicon-oxygen anode material (SiO with a capacity of 1600 mAh/g), 8 parts by weight of the first polymer, and 2 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.5 g of 4,4'-dicyclohexylmethane diisocyanate and 4.5 g of a hydroxyl-terminated ethylene oxide polymer (TT310 from Tiantai Chemical), which were subjected to water removal, were added together to a mixing bowl, 0.2 g of 1,4-butanediol was added as a cross-linker, 0.01 g of bismuth 2-ethylhexanoate was added as a catalyst, and these materials were mixed at 2000 rpm for 10 min in a defoamer to obtain a mixture. 0.5 parts by weight of the mixture and 99.5 parts by weight of the solvent-free mixture obtained in step (2) were mixed at 2000 rpm for 10 min in the defoamer. A reaction was performed after standing at normal temperature for 5 h until the adhesive was cured, and the obtained product was ground into fine powder with a mortar to obtain the silicon-oxygen anode material with a surface joined to an adhesive.

Example 16

This example provides a silicon-oxygen anode material with a surface joined to an adhesive, and a preparation method therefor includes the steps below.

(1) An aqueous solution (800 g) where 2 g of polyvinyl alcohol (PVA) was dispersed was placed in a 2000 L reaction kettle, in a state of stirring at a rotational speed of 250 rpm, nitrogen with a purity of ≥99.9% was introduced, first polymerizable monomers including 100 g of methyl acrylate, 10 g of acrylamide monomer, 10 g of acrylonitrile, and 10 g of styrene were added, and 0.5 g of AIBN was added as an initiator, continuously stirred and continuously introduced with nitrogen, the solution was heated to 50° C., a first polymerization reaction was performed for 15 h to obtain a polymerization product, the polymerization product was depressurized with a vacuum pump to a vacuum degree lower than 0.1 MPa, and residual unreacted monomer components were removed to obtain a first polymer.

(2) 99 parts by weight of the silicon-oxygen anode material (SiO with a capacity of 1600 mAh/g), 0.5 parts by weight of the first polymer, and 0.5 parts by weight of conductive carbon black were added to a metered amount of deionized water to prepare a dispersion slurry with a solid content of 45%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 4.5 g of isophorone diisocyanate and 5 g of a hydroxyl-terminated ethylene oxide polymer (TT310 from Tiantai Chemical), which were subjected to water removal, were added together to a mixing bowl, 0.8 g of 1,4-butanediol was added as a cross-linker, 0.02 g of bismuth 2-ethylhexanoate was added as a catalyst, and these materials were mixed at 2000 rpm for 10 min in a defoamer to obtain a mixture. 10 parts by weight of the mixture and 90 parts by weight of the solvent-free mixture obtained in step (2) were mixed at 2000 rpm for 10 min in the defoamer. A reaction was performed after standing at 40° C. for 30 h until the adhesive was cured, and the obtained product was ground into fine powder with a mortar to obtain the silicon-oxygen anode material with a surface joined to an adhesive.

Example 17

This example provides a silicon-oxygen anode material with a surface joined to an adhesive, and a preparation method therefor includes the steps below.

(1) An aqueous solution (800 g) where 5 g of polyvinyl alcohol (PVA) was dispersed was placed in a 2000 L reaction kettle, in a state of stirring at a rotational speed of 250 rpm, nitrogen with a purity of ≥99.9% was introduced, first polymerizable monomers including 80 g of methyl acrylate, 10 g of acrylamide monomer, 5 g of acrylonitrile, and 10 g of styrene were added, and 0.5 g of AIBN was added as an initiator, continuously stirred and continuously introduced with nitrogen, the solution was heated to 75° C., a first polymerization reaction was performed for 8 h to obtain a polymerization product, the polymerization product was depressurized with a vacuum pump to a vacuum degree lower than 0.1 MPa, and residual unreacted monomer components were removed to obtain a first polymer.

(2) 93 parts by weight of the silicon-oxygen anode material (SiO with a capacity of 1600 mAh/g), 2 parts by weight of the first polymer, and 5 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.5 g of 1,5-naphthalene diisocyanate and 3.5 g of a hydroxyl-terminated ethylene oxide polymer (TT310 from Tiantai Chemical), which were subjected to water removal, were added together to a mixing bowl, 0.4 g of 1,4-butanediol was added as a cross-linker, 0.01 g of bismuth 2-ethylhexanoate was added as a catalyst, and these materials were mixed at 2000 rpm for 10 min in a defoamer to obtain a mixture. 10 parts by weight of the mixture and 90 parts by weight of the solvent-free mixture obtained in step (2) were mixed at 2000 rpm for 10 min in the defoamer. A reaction was performed after standing at 100° C. for 5 h until the adhesive was cured, and the obtained product was ground into fine powder with a mortar to obtain the silicon-oxygen anode material with a surface joined to an adhesive.

Example 18

This example differs from Example 1 only in that step (1) was performed as follows:

(1) An aqueous solution (800 g) where 5 g of polyvinyl alcohol (PVA) was dispersed was placed in a 2000 L reaction kettle, in a state of stirring at a rotational speed of 250 rpm, nitrogen with a purity of ≥99.9% was introduced, first polymerizable monomers including 100 g of methyl acrylate, 10 g of acrylamide monomer, and 10 g of acrylonitrile were added, 0.5 g of cellulose acetate was added, and 0.5 g of AIBN was added as an initiator, continuously stirred and continuously introduced with nitrogen, the solution was heated to 75° C., a first polymerization reaction was performed for 5 h to obtain a polymerization product, the polymerization product was depressurized with a vacuum pump to a vacuum degree lower than 0.1 MPa, and residual unreacted monomer components were removed to obtain a first polymer.

Example 19

This example differs from Example 18 only in that cellulose acetate was replaced with 5 g of carboxymethyl cellulose.

Example 20

This example differs from Example 12 only in that the first polymerizable monomers in step (1) included only 110 g of methyl acrylate and 10 g of acrylamide monomer.

Example 21

This example differs from Example 12 only in that the first polymerizable monomers in step (1) included only 110 g of methyl acrylate and 10 g of acrylonitrile.

Example 22

This example differs from Example 12 only in that the first polymerizable monomers in step (1) included only 110 g of methyl acrylate and 10 g of styrene.

Example 23

This example differs from Example 12 only in that the first polymerizable monomers in step (1) included only 120 g of methyl acrylate.

Example 24

This example differs from Example 12 only in that the first polymerizable monomers in step (1) included only 120 g of acrylamide monomer.

Example 25

This example differs from Example 12 only in that the first polymerizable monomers in step (1) included only 120 g of styrene.

Example 26

This example differs from Example 12 only in that the first polymerizable monomers in step (1) included only 120 g of acrylonitrile.

Comparative Example 5

This comparative example differs from Example 12 only in that the hydroxyl-terminated ethylene oxide polymer in step (3) was replaced with a hydroxyl-terminated acrylate polymer (UT-1001 from Soken Chemical & Engineering Co., Ltd.).

Comparative Example 6

This comparative example differs from Example 12 only in that in-situ polymerization in step (3) was not performed, and the solvent-free mixture obtained in step (2) was directly used as the silicon-oxygen anode material with a surface joined to an adhesive.

Comparative Example 7

This comparative example provides a modified silicon-oxygen anode material, and a preparation method therefor includes the steps below.

5 g of hexamethylene diisocyanate and 4 g of a hydroxyl-terminated ethylene oxide polymer (TT310 from Tiantai Chemical), which were subjected to water removal, were added together to a mixing bowl, 0.3 g of 1,4-butanediol was added as a cross-linker, 0.01 g of dibutyltin dilaurate was added as a catalyst, and these materials were mixed at 2000 rpm for 10 min in a defoamer to obtain a mixture. 1 part by weight of the mixture and 99 parts by weight of a silicon-oxygen anode material were mixed at 2000 rpm for 10 min in the defoamer. An in-situ polymerization reaction was performed after standing at normal temperature for 12 h until an adhesive was cured, and the obtained product was ground into fine powder with a mortar to obtain the modified silicon-oxygen anode material.

Application Examples 12 to 26 and Comparative Application Examples 5 to 7

The silicon-oxygen anode materials prepared above were prepared into anode sheets. Specifically, the silicon-oxygen anode materials obtained in Examples 12 to 26 and Comparative Examples 5 to 7 were each mixed with a conductive agent carbon black (Surper P) and an adhesive PAA at a mass ratio of 85:5:10 to obtain a slurry, and the slurry was coated on a copper foil to form an anode sheet.

The prepared anode sheet and a lithium metal electrode sheet were assembled into a lithium-ion button battery. $LiPF_6$ was dissolved at a concentration of 1 mol/L in an electrolyte containing EC/DEC/EMC=23:1. After the button battery was assembled, initial coulombic efficiency and cycles were tested according to the following steps: standing for 2 h; constant current discharging at 0.1 C to 0.005 V, at 0.08 C to 0.001 V, at 0.05 C to 0.001 V, and at 0.02 C to 0.001 V; standing for 10 min; constant current charging at 0.1 C to 1.5 V.

The test results of the initial coulombic efficiency and the cycles are shown in Table 2.

TABLE 2

| Name | Ratio of the Slurry of the Anode Sheet | Initial coulombic efficiency (%) | Capacity Retention Rate After 1000 Cycles (%) |
|---|---|---|---|
| Application Example 12 | Silicon-oxygen anode material:SP:adhesive = 85:5:10 | 90.1 | 81.5 |
| Application Example 13 | Silicon-oxygen anode material:SP:adhesive = 85:5:10 | 90.5 | 81.0 |
| Application Example 14 | Silicon-oxygen anode material:SP:adhesive = 85:5:10 | 91.4 | 81.6 |
| Application Example 15 | Silicon-oxygen anode material:SP:adhesive = 85:5:10 | 89.9 | 80.2 |
| Application Example 16 | Silicon-oxygen anode material:SP:adhesive = 85:5:10 | 90.5 | 81.0 |
| Application Example 17 | Silicon-oxygen anode material:SP:adhesive = 85:5:10 | 89.6 | 80.7 |
| Application Example 18 | Silicon-oxygen anode material:SP:adhesive = 85:5:10 | 91.9 | 83.0 |
| Application Example 19 | Silicon-oxygen anode material:SP:adhesive = 85:5:10 | 92.0 | 84.9 |
| Application Example 20 | Silicon-oxygen anode material:SP:adhesive = 85:5:10 | 89.9 | 80.9 |
| Application Example 21 | Silicon-oxygen anode material:SP:adhesive = 85:5:10 | 88.3 | 80.2 |
| Application Example 22 | Silicon-oxygen anode material:SP:adhesive = 85:5:10 | 87.5 | 81.2 |
| Application Example 23 | Silicon-oxygen anode material:SP:adhesive = 85:5:10 | 87.8 | 80.5 |
| Application Example 24 | Silicon-oxygen anode material:SP:adhesive = 85:5:10 | 88.0 | 80.4 |
| Application Example 25 | Silicon-oxygen anode material:SP:adhesive = 85:5:10 | 88.3 | 81.2 |
| Application Example 26 | Silicon-oxygen anode material:SP:adhesive = 85:5:10 | 87.8 | 81.5 |
| Comparative Application Example 5 | Silicon-oxygen anode material:SP:adhesive = 85:5:10 | 71.8 | 55.3 |
| Comparative Application Example 6 | Silicon-oxygen anode material:SP:adhesive = 85:5:10 | 72.0 | 52.7 |
| Comparative Application Example 7 | Silicon-oxygen anode material:SP:adhesive = 85:5:10 | 76.3 | 51.9 |

As can be seen from the results in Table 2, the silicon-oxygen anode material with a surface joined to an adhesive of the present application can cause the battery using the same to reach a initial coulombic efficiency of 87% or above and a capacity retention rate of 80% or above after 1000 cycles and have high initial coulombic efficiency and cycle stability.

In Comparative Example 5, the hydroxyl-terminated ethylene oxide polymer was replaced with the hydroxyl-terminated acrylate polymer in a second polymer. Since an acrylate has a weaker force with functional groups on the surface of the silicon-oxygen material than ethylene oxide, the battery has reduced initial coulombic efficiency and cycle stability.

In Comparative Example 6, since the in-situ polymerization in step (3) was not performed, the adhesive in the obtained silicon-oxygen anode material with a surface joined to an adhesive includes only the first polymer. Therefore, a good polymer coating network structure cannot be formed, and thus the battery has reduced initial coulombic efficiency and cycle stability.

In Comparative Example 7, the adhesive in the obtained silicon-oxygen anode material with a surface joined to an adhesive includes only the second polymer. Therefore, a good polymer coating network structure cannot be formed, and thus the battery has reduced initial coulombic efficiency and cycle stability.

Examples 27 to 41, Comparative Examples 8 to 11, Application Examples 27 to 41, and Comparative Application Examples 8 to 11 provide an artificial graphite anode material with a surface joined to an adhesive and an anode sheet prepared therefrom.

Example 27

This example provides an artificial graphite anode material with a surface joined to an adhesive, and a preparation method therefor includes the steps below.

(1) An aqueous solution (800.0 g) where 5.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 90.0 g of methyl acrylate, 20.0 g of acrylamide monomer, and 10.0 g of acrylonitrile were added, and 0.5 g of azobisisobutyronitrile (AIBN) was added as an initiator, continuously stirred and continuously introduced with nitrogen, the solution was heated to 80° C., the first polymerization reaction was performed for 8 h to obtain a polymerization product, the polymerization product was depressurized with a vacuum pump to a vacuum degree lower than 0.1 MPa, and residual unreacted monomer components were removed to obtain a first adhesive.

(2) 98 parts by weight of the artificial graphite anode material (ZS1 from Zhejiang Carbon One) and 2 parts by weight of the first adhesive were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.00 g of hexamethylene diisocyanate and 4.00 g of a polyol polymer (a polyether polyol DL. from Bluestar Dongda), which were subjected to water removal, were added together to a mixing bowl, 0.30 g of 1,4-butanediol was added as a cross-linker, 0.01 g of dibutyltin dilaurate was added as a catalyst, and these materials were mixed at 2000 rpm for 10 min in a defoamer to obtain a mixture. 1 part by weight of the mixture and 99 parts by weight of the solvent-free mixture obtained in step (2) were mixed at 2000 rpm for 10 min in the defoamer. An in-situ polymerization reaction was performed after standing at normal temperature for 12 h until the adhesive was cured, and the obtained product was ground into fine powder with a mortar to obtain the artificial graphite anode material with a surface joined to an adhesive.

Example 28

This example provides an artificial graphite anode material with a surface joined to an adhesive, and a preparation method therefor includes the steps below.

(1) An aqueous solution (800.0 g) where 5.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 50.0 g of methyl acrylate, 10.0 g of acrylamide monomer, 20.0 g of acrylonitrile, and 10.0 g of styrene were added, and 0.5 g of azobisisobutyronitrile (AIBN) was added as an initiator, continuously stirred and continuously introduced with nitrogen, the solution was heated to 85° C., the first polymerization reaction was performed for 10 h to obtain a polymerization product, the polymerization product was depressurized with a vacuum pump to a vacuum degree lower than 0.1 MPa, and residual unreacted monomer components were removed to obtain a first adhesive.

(2) 92 parts by weight of the artificial graphite anode material (ZS1 from Zhejiang Carbon One) and 8 parts by weight of the first adhesive were added to a metered amount of deionized water to prepare a dispersion slurry with a solid content of 45%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.00 g of toluene diisocyanate and 4.00 g of a polyol polymer (a polyether polyol DL. from Bluestar Dongda), which were subjected to water removal, were added together to a mixing bowl, 0.30 g of 1,4-cyclohexanediol was added as a cross-linker, 0.02 g of dibutyltin dilaurate was added as a catalyst, and these materials were mixed at 2000 rpm for 10 min in a defoamer to obtain a mixture. 1 part by weight of the mixture and 99 parts by weight of the solvent-free mixture obtained in step (2) were mixed at 2000 rpm for 10 min in the defoamer. A reaction was performed after standing at normal temperature for 15 h until the adhesive was cured, and the obtained product was ground into fine powder with a mortar to obtain the artificial graphite anode material with a surface joined to an adhesive.

Example 29

This example provides an artificial graphite anode material with a surface joined to an adhesive, and a preparation method therefor includes the steps below.

(1) An aqueous solution (800.0 g) where 8.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 50.0 g of methyl acrylate, 15.0 g of acrylamide monomer, 15.0 g of acrylonitrile, and 5.0 g of styrene were added, and 0.5 g of azobisisobutyronitrile (AIBN) was added as an initiator, continuously stirred and continuously introduced with nitrogen, the solution was heated to 80° C., the first polymerization reaction was performed for 10 h to obtain a polymerization product, the polymerization product was depressurized with a vacuum pump to a vacuum degree lower than 0.1 MPa, and residual unreacted monomer components were removed to obtain a first adhesive.

(2) 99 parts by weight of the artificial graphite anode material (ZS1 from Zhejiang Carbon One), 0.5 parts by weight of the first adhesive, and 0.5 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.00 g of tetramethylxylylene diisocyanate and 4.50 g of a polyol polymer (a polyester polyol from Pasto), which were subjected to water removal, were added together to a mixing bowl, 0.60 g of propylene glycol was added as a cross-linker, 0.02 g of bismuth 2-ethylhexanoate was added as a catalyst, and these materials were mixed at 2000 rpm for 10 min in a defoamer to obtain a mixture. 5 parts by weight of the mixture and 95 parts by weight of the solvent-free mixture obtained in step (2) were mixed at 2000 rpm for 10 min in the defoamer. A reaction was performed after standing at normal temperature for 24 h until the adhesive was cured, and the obtained product was ground into fine powder with a mortar to obtain the artificial graphite anode material with a surface joined to an adhesive.

Example 30

This example provides an artificial graphite anode material with a surface joined to an adhesive, and a preparation method therefor includes the steps below.

(1) An aqueous solution (800.0 g) where 2.0 g of polyvinyl alcohol (PVA) and 3.0 g of sodium dodecyl benzenesulfonate were dispersed was placed in a 2000 L reaction kettle, in a state of stirring at a rotational speed of 250 rpm, nitrogen with a purity of ≥99.9% was introduced, monomers of a first polymerization reaction including 100.0 g of methyl acrylate, 10.0 g of acrylamide monomer, 10.0 g of acrylonitrile, and 10.0 g of styrene were added, and 0.5 g of azobisisobutyronitrile (AIBN) was added as an initiator, continuously stirred and continuously introduced with nitrogen, the solution was heated to 95° C., the first polymerization reaction was performed for 3 h to obtain a polymerization product, the polymerization product was depressurized with a vacuum pump to a vacuum degree lower than 0.1 MPa, and residual unreacted monomer components were removed to obtain a first adhesive.

(2) 92 parts by weight of the artificial graphite anode material (ZS1 from Zhejiang Carbon One), 6 parts by weight of the first adhesive, and 2 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.50 g of 4,4'-dicyclohexylmethane diisocyanate and 4.50 g of a polyol polymer (TT310 from Tiantai Chemical), which were subjected to water removal, were added together to a mixing bowl, 0.20 g of diethanolamine was added as a cross-linker, 0.01 g of bismuth 2-ethylhexanoate was added as a catalyst, and these materials were mixed at 2000 rpm for 10 min in a defoamer to obtain a mixture. 0.5 parts by weight of the mixture and 99.5 parts by weight of the solvent-free mixture obtained in step (2) were mixed at 2000 rpm for 10 min in the defoamer. A reaction was performed after standing at normal temperature for 5 h until the adhesive was cured, and the obtained product was ground into fine powder with a mortar to obtain the artificial graphite anode material with a surface joined to an adhesive.

Example 31

This example provides an artificial graphite anode material with a surface joined to an adhesive, and a preparation method therefor includes the steps below.

(1) An aqueous solution (800.0 g) where 2.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 100.0 g of methyl acrylate, 10.0 g of acrylamide monomer, 10.0 g of acrylonitrile, and 10.0 g of styrene were added, and 0.5 g of azobisisobutyronitrile (AIBN) was added as an initiator, continuously stirred and continuously introduced with nitrogen, the solution was heated to 50° C., the first polymerization reaction was performed for 15 h to obtain a polymerization product, the polymerization product was depressurized with a vacuum pump to a vacuum degree lower than 0.1 MPa, and residual unreacted monomer components were removed to obtain a first adhesive.

(2) 98.0 parts by weight of the artificial graphite anode material (ZS1 from Zhejiang Carbon One), 1.5 parts by weight of the first adhesive, and 0.5 parts by weight of conductive carbon black were added to a metered amount of deionized water to prepare a dispersion slurry with a solid content of 45%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 4.50 g of isophorone diisocyanate and 5.00 g of a polyol polymer (a polyester polyol from Pasto), which were subjected to water removal, were added together to a mixing bowl, 0.80 g of 3,5-diethyltoluenediamine was added as a cross-linker, 0.02 g of bismuth 2-ethylhexanoate was added as a catalyst, and these materials were mixed at 2000 rpm for 10 min in a defoamer to obtain a mixture. 10 parts by weight of the mixture and 90 parts by weight of the solvent-free mixture obtained in step (2) were mixed at 2000 rpm for 10 min in the defoamer. A reaction was performed after standing at 40° C. for 30 h until the adhesive was cured, and the obtained product was ground into fine powder with a mortar to obtain the artificial graphite anode material with a surface joined to an adhesive.

Example 32

This example provides an artificial graphite anode material with a surface joined to an adhesive, and a preparation method therefor includes the steps below.

(1) An aqueous solution (800.0 g) where 5.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 80.0 g of methyl acrylate, 10.0 g of acrylamide monomer, 5.0 g of acrylonitrile, and 10.0 g of styrene were added, and 0.5 g of azobisisobutyronitrile (AIBN) was added as an initiator, continuously stirred and continuously introduced with nitrogen, the solution was heated to 75° C., the first polymerization reaction was performed for 8 h to obtain a polymerization product, the polymerization product was depressurized with a vacuum pump to a vacuum degree lower than 0.1 MPa, and residual unreacted monomer components were removed to obtain a first adhesive.

(2) 93 parts by weight of the artificial graphite anode material (ZS1 from Zhejiang Carbon One), 3 parts by weight of the first adhesive, and 4 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.50 g of 1,5-naphthalene diisocyanate and 3.50 g of a polyol polymer (a polyester polyol from Pasto), which were subjected to water removal, were added together to a mixing bowl, 0.40 g of ethylene glycol was added as a cross-linker, 0.01 g of bismuth 2-ethylhexanoate was added as a catalyst, and these materials were mixed at 2000 rpm for 10 min in a defoamer to obtain a mixture. 8 parts by weight of the mixture and 92 parts by weight of the solvent-free mixture obtained in step (2) were mixed at 2000 rpm for 10 min in the defoamer. A reaction was performed after standing at 100° C. for 5 h until the adhesive was cured, and the obtained product was ground into fine powder with a mortar to obtain the artificial graphite anode material with a surface joined to an adhesive.

Example 33

This example differs from Example 27 only in that step (1) was performed as follows:

(1) An aqueous solution (800.0 g) where 5.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 90.0 g of methyl acrylate, 20.0 g of acrylamide monomer, and 10.0 g of acrylonitrile were added, 0.5 g of cellulose acetate was added, and 0.5 g of azobisisobutyronitrile (AIBN) was added as an initiator, continuously stirred and continuously introduced with nitrogen, the solution was heated to 80° C., the first polymerization reaction was performed for 8 h to obtain a polymerization product, the polymerization product was depressurized with a vacuum pump to a vacuum degree lower than 0.1 MPa, and residual unreacted monomer components were removed to obtain a first adhesive. Other steps were the same as those in Example 27.

Example 34

This example differs from Example 33 only in that cellulose acetate was replaced with 6.0 g of carboxymethyl cellulose.

Example 35

This example differs from Example 27 only in that the monomers of the first polymerization reaction in step (1) included only 99.0 g of methyl acrylate and 21.0 g of acrylamide monomer.

Example 36

This example differs from Example 27 only in that the monomers of the first polymerization reaction in step (1) included only 108.0 g of methyl acrylate and 12.0 g of acrylonitrile.

Example 37

This example differs from Example 28 only in that the monomers of the first polymerization reaction in step (1) included only 75.0 g of methyl acrylate and 15.0 g of styrene.

Example 38

This example differs from Example 27 only in that the monomers of the first polymerization reaction in step (1) included only 120.0 g of methyl acrylate.

Example 39

This example differs from Example 27 only in that the monomers of the first polymerization reaction in step (1) included only 120.0 g of acrylamide monomer.

Example 40

This example differs from Example 28 only in that the monomers of the first polymerization reaction in step (1) included only 90.0 g of styrene.

Example 41

This example differs from Example 27 only in that the monomers of the first polymerization reaction in step (1) included only 120.0 g of acrylonitrile.

Comparative Example 8

This comparative example differs from Example 27 only in that the polyol polymer in step (3) was replaced with a hydroxyl-terminated acrylate polymer (UT-1001 from Soken Chemical & Engineering Co., Ltd.).

Comparative Example 9

This comparative example differs from Example 27 only in that the polyol polymer in step (3) was replaced with a hydroxyl-terminated ethylene oxide polymer (TT310 from Tiantai Chemical).

Comparative Example 10

This comparative example differs from Example 27 only in that in-situ polymerization in step (3) was not performed, and the solvent-free mixture obtained in step (2) was directly used as the artificial graphite anode material with a surface joined to an adhesive.

Comparative Example 11

This comparative example provides a modified artificial graphite anode material, and a preparation method therefor includes the steps below. 5.00 g of hexamethylene diisocyanate and 4.00 g of a polyol polymer (a polyether polyol DL. from Bluestar Dongda), which were subjected to water removal, were added together to a mixing bowl, 0.30 g of 1,4-butanediol was added as a cross-linker, 0.01 g of dibutyltin dilaurate was added as a catalyst, and these materials were mixed at 2000 rpm for 10 min in a defoamer to obtain a mixture. 1 part by weight of the mixture and 99 parts by weight of an artificial graphite anode material were mixed at 2000 rpm for 10 min in the defoamer. An in-situ polymerization reaction was performed after standing at normal temperature for 12 h until an adhesive was cured, and the obtained product was ground into fine powder with a mortar to obtain the modified artificial graphite anode material.

Application Examples 27 to 41 and Comparative Application Examples 8 to 11

The artificial graphite anode materials prepared above were prepared into electrode sheets. Specifically, the artificial graphite anode materials obtained in Examples 27 to 41 and Comparative Examples 8 to 11 were each mixed with a conductive agent carbon black (Surper P) and an adhesive PAA at a mass ratio of 96.5:1.5:2.0 to obtain a slurry, and the slurry was coated on a copper foil to form an anode sheet. The prepared anode sheet and a lithium metal electrode sheet were assembled into a lithium-ion button battery. $LiPF_6$ was dissolved at a concentration of 1 mol/L in an electrolyte containing ethylene carbonate/diethyl carbonate/ethyl methyl carbonate=2:3:1. After the button battery was assembled, initial coulombic efficiency and cycles were tested according to the following steps: standing for 2 h; constant current discharging at 0.10 C to 0.005 V, at 0.08 C to 0.001 V, at 0.05 C to 0.001 V, and at 0.02 C to 0.001 V; standing for 10 min; constant current charging at 0.10 C to 1.5000 V.

The test results of the initial coulombic efficiency and the cycles are shown in Table 3.

TABLE 3

| Name | Ratio of the Slurry of the Anode Sheet | Initial coulombic efficiency (%) | Capacity Retention Rate After 1000 Cycles (%) |
|---|---|---|---|
| Application Example 27 | Artificial graphite anode material:SP:adhesive = 96.5:1.5:2.0 | 94.5 | 89.6 |
| Application Example 28 | Artificial graphite anode material:SP:adhesive = 96.5:1.5:2.0 | 95.0 | 88.5 |
| Application Example 29 | Artificial graphite anode material:SP:adhesive = 96.5:1.5:2.0 | 94.9 | 89.1 |
| Application Example 30 | Artificial graphite anode material:SP:adhesive = 96.5:1.5:2.0 | 95.1 | 88.5 |
| Application Example 31 | Artificial graphite anode material:SP:adhesive = 96.5:1.5:2.0 | 95.4 | 88.4 |
| Application Example 32 | Artificial graphite anode material:SP:adhesive = 96.5:1.5:2.0 | 94.5 | 88.8 |
| Application Example 33 | Artificial graphite anode material:SP:adhesive = 96.5:1.5:2.0 | 95.3 | 89.3 |
| Application Example 34 | Artificial graphite anode material:SP:adhesive = 96.5:1.5:2.0 | 95.6 | 89.5 |
| Application Example 35 | Artificial graphite anode material:SP:adhesive = 96.5:1.5:2.0 | 94.6 | 87.5 |
| Application Example 36 | Artificial graphite anode material:SP:adhesive = 96.5:1.5:2.0 | 95.7 | 88.2 |
| Application Example 37 | Artificial graphite anode material:SP:adhesive = 96.5:1.5:2.0 | 95.9 | 86.4 |
| Application Example 38 | Artificial graphite anode material:SP:adhesive = 96.5:1.5:2.0 | 95.2 | 87.9 |
| Application Example 39 | Artificial graphite anode material:SP:adhesive = 96.5:1.5:2.0 | 94.8 | 87.7 |
| Application Example 40 | Artificial graphite anode material:SP:adhesive = 96.5:1.5:2.0 | 95.1 | 88.0 |
| Application Example 41 | Artificial graphite anode material:SP:adhesive = 96.5:1.5:2.0 | 95.0 | 86.9 |
| Comparative Application Example 8 | Artificial graphite anode material:SP:adhesive = 96.5:1.5:2.0 | 93.3 | 81.1 |
| Comparative Application Example 9 | Artificial graphite anode material:SP:adhesive = 96.5:1.5:2.0 | 92.9 | 82.5 |
| Comparative Application Example 10 | Artificial graphite anode material:SP:adhesive = 96.5:1.5:2.0 | 93.0 | 82.1 |
| Comparative | Artificial graphite anode | 92.8 | 81.5 |

TABLE 3-continued

| Name | Ratio of the Slurry of the Anode Sheet | Initial coulombic efficiency (%) | Capacity Retention Rate After 1000 Cycles (%) |
|---|---|---|---|
| Application Example 11 | material:SP:adhesive = 96.5:1.5:2.0 | | |

As can be seen from the results in Table 3, the artificial graphite anode material with a surface joined to an adhesive of the present application can cause the battery using the same to reach a initial coulombic efficiency of 94% or above and a capacity retention rate of 86% or above after 1000 cycles and have high battery efficiency and cycle stability.

In Comparative Example 8, the polyol polymer was replaced with the hydroxyl-terminated acrylate polymer in a second adhesive. Since a hydroxyl-terminated acrylate has a weaker force with the surface of artificial graphite than the polyol polymer, the battery has reduced initial coulombic efficiency and cycle stability.

In Comparative Example 9, the polyol polymer was replaced with the hydroxyl-terminated ethylene oxide polymer in the second adhesive. Since the hydroxyl-terminated ethylene oxide polymer has a weaker force with the surface of artificial graphite than the polyol polymer, the battery has reduced initial coulombic efficiency and cycle stability.

In Comparative Example 10, since the in-situ polymerization in step (3) was not performed, the adhesive in the obtained artificial graphite anode material with a surface joined to an adhesive includes only the first adhesive. In Comparative Example 11, the adhesive in the obtained artificial graphite anode material with a surface joined to an adhesive includes only the second adhesive. Therefore, a good polymer coating network structure cannot be formed, and thus the batteries in Comparative Examples 10 and 11 have reduced initial coulombic efficiency and cycle stability.

Examples 42 to 56, Comparative Examples 12 to 15, Application Examples 42 to 56, and Comparative Application Examples 12 to 15 provide a natural graphite anode material with a surface joined to an adhesive and an anode sheet prepared therefrom.

Example 42

This example provides a natural graphite anode material with a surface joined to an adhesive, and a preparation method therefor includes the steps below.

(1) An aqueous solution (800.0 g) where 5.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 90.0 g of methyl acrylate, 20.0 g of acrylamide monomer, and 10.0 g of acrylonitrile were added, and 0.5 g of azobisisobutyronitrile (AIBN) was added as an initiator, continuously stirred and continuously introduced with nitrogen, the solution was heated to 75° C., the first polymerization reaction was performed for 10 h to obtain a polymerization product, the polymerization product was depressurized with a vacuum pump to a vacuum degree lower than 0.1 MPa, and residual unreacted monomer components were removed to obtain a first adhesive.

(2) 97 parts by weight of the natural graphite anode material (CONE-P from Zhejiang Carbon One) and 3 parts by weight of the first adhesive were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.00 g of hexamethylene diisocyanate and 4.00 g of a hydroxyl-terminated acrylate polymer (UT-1001 from Soken Chemical & Engineering Co., Ltd.), which were subjected to water removal, were added together to a mixing bowl, 0.30 g of 1,4-butanediol was added as a cross-linker, 0.01 g of dibutyltin dilaurate was added as a catalyst, and these materials were mixed at 2000 rpm for 10 min in a defoamer to obtain a mixture. 1 part by weight of the mixture and 99 parts by weight of the solvent-free mixture obtained in step (2) were mixed at 2000 rpm for 10 min in the defoamer. An in-situ polymerization reaction was performed after standing at normal temperature for 12 h until the adhesive was cured, and the obtained product was ground into fine powder with a mortar to obtain the natural graphite anode material with a surface joined to an adhesive.

Example 43

This example provides a natural graphite anode material with a surface joined to an adhesive, and a preparation method therefor includes the steps below.

(1) An aqueous solution (800.0 g) where 5.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 50.0 g of methyl acrylate, 10.0 g of acrylamide monomer, 20.0 g of acrylonitrile, and 10.0 g of styrene were added, and 0.5 g of azobisisobutyronitrile (AIBN) was added as an initiator, continuously stirred and continuously introduced with nitrogen, the solution was heated to 90° C., the first polymerization reaction was performed for 8 h to obtain a polymerization product, the polymerization product was depressurized with a vacuum pump to a vacuum degree lower than 0.1 MPa, and residual unreacted monomer components were removed to obtain a first adhesive.

(2) 92 parts by weight of the natural graphite anode material (CONE-P from Zhejiang Carbon One) and 8 parts by weight of the first adhesive were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.00 g of toluene diisocyanate and 4.00 g of a hydroxyl-terminated acrylate polymer (UT-1001 from Soken Chemical & Engineering Co., Ltd.), which were subjected to water removal, were added together to a mixing bowl, 0.30 g of propylene glycol was added as a cross-linker, 0.02 g of dibutyltin dilaurate was added as a catalyst, and these materials were mixed at 2000 rpm for 10 min in a defoamer to obtain a mixture. 1 part by weight of the mixture and 99 parts by weight of the solvent-free mixture obtained in step (2) were mixed at 2000 rpm for 10 min in the defoamer. A reaction was performed after standing at normal temperature for 15 h until the adhesive was cured, and the obtained product was ground into fine powder with a mortar to obtain the natural graphite anode material with a surface joined to an adhesive.

Example 44

This example provides a natural graphite anode material with a surface joined to an adhesive, and a preparation method therefor includes the steps below.

(1) An aqueous solution (800.0 g) where 8.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 50.0 g of methyl acrylate, 15.0 g of acrylamide monomer, 15.0 g of acrylonitrile, and 5.0 g of styrene were added, and 0.5 g of azobisisobutyronitrile (AIBN) was added as an initiator, continuously stirred and continuously introduced with nitrogen, the solution was heated to 80° C., the first polymerization reaction was performed for 10 h to obtain a polymerization product, the polymerization product was depressurized with a vacuum pump to a vacuum degree lower than 0.1 MPa, and residual unreacted monomer components were removed to obtain a first adhesive.

(2) 99 parts by weight of the natural graphite anode material (CONE-P from Zhejiang Carbon One), 0.5 parts by weight of the first adhesive, and 0.5 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.00 g of tetramethylxylylene diisocyanate and 4.50 g of a hydroxyl-terminated acrylate polymer (UT-1001 from Soken Chemical & Engineering Co., Ltd.), which were subjected to water removal, were added together to a mixing bowl, 0.60 g of 3,5-diethyltoluenediamine was added as a cross-linker, 0.02 g of bismuth 2-ethylhexanoate was added as a catalyst, and these materials were mixed at 2000 rpm for 10 min in a defoamer to obtain a mixture. 5 parts by weight of the mixture and 95 parts by weight of the solvent-free mixture obtained in step (2) were mixed at 2000 rpm for 10 min in the defoamer. A reaction was performed after standing at normal temperature for 24 h until the adhesive was cured, and the obtained product was ground into fine powder with a mortar to obtain the natural graphite anode material with a surface joined to an adhesive.

Example 45

This example provides a natural graphite anode material with a surface joined to an adhesive, and a preparation method therefor includes the steps below.

(1) An aqueous solution (800.0 g) where 2.0 g of polyvinyl alcohol (PVA) and 3.0 g of sodium dodecyl benzenesulfonate were dispersed was placed in a 2000 L reaction kettle, in a state of stirring at a rotational speed of 250 rpm, nitrogen with a purity of ≥99.9% was introduced, monomers of a first polymerization reaction including 100.0 g of methyl acrylate, 10.0 g of acrylamide monomer, 10.0 g of acrylonitrile, and 10.0 g of styrene were added, and 0.5 g of azobisisobutyronitrile (AIBN) was added as an initiator, continuously stirred and continuously introduced with nitrogen, the solution was heated to 95° C., the first polymerization reaction was performed for 3 h to obtain a polymerization product, the polymerization product was depressurized with a vacuum pump to a vacuum degree lower than 0.1 MPa, and residual unreacted monomer components were removed to obtain a first adhesive.

(2) 92 parts by weight of the natural graphite anode material (CONE-P from Zhejiang Carbon One), 6 parts by weight of the first adhesive, and 2 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.50 g of 4,4'-dicyclohexylmethane diisocyanate and 4.50 g of a hydroxyl-terminated acrylate polymer (TT310 from Tiantai Chemical), which were subjected to water removal, were added together to a mixing bowl, 0.20 g of 1,4-cyclohexanediol was added as a cross-linker, 0.01 g of bismuth 2-ethylhexanoate was added as a catalyst, and these materials were mixed at 2000 rpm for 10 min in a defoamer to obtain a mixture. 0.5 parts by weight of the mixture and 99.5 parts by weight of the solvent-free mixture obtained in step (2) were mixed at 2000 rpm for 10 min in the defoamer. A reaction was performed after standing at normal temperature for 5 h until the adhesive was cured, and the obtained product was ground into fine powder with a mortar to obtain the natural graphite anode material with a surface joined to an adhesive.

Example 46

This example provides a natural graphite anode material with a surface joined to an adhesive, and a preparation method therefor includes the steps below.

(1) An aqueous solution (800.0 g) where 2.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 100.0 g of methyl acrylate, 10.0 g of acrylamide monomer, 10.0 g of acrylonitrile, and 10.0 g of styrene were added, and 0.5 g of azobisisobutyronitrile (AIBN) was added as an initiator, continuously stirred and continuously introduced with nitrogen, the solution was heated to 50° C., the first polymerization reaction was performed for 15 h to obtain a polymerization product, the polymerization product was depressurized with a vacuum pump to a vacuum degree lower than 0.1 MPa, and residual unreacted monomer components were removed to obtain a first adhesive.

(2) 98 parts by weight of the natural graphite anode material (CONE-P from Zhejiang Carbon One), 1.5 parts by weight of the first adhesive, and 0.5 parts by weight of conductive carbon black were added to a metered amount of deionized water to prepare a dispersion slurry with a solid content of 45%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 4.50 g of isophorone diisocyanate and 5.00 g of a hydroxyl-terminated acrylate polymer (UT-1001 from Soken Chemical & Engineering Co., Ltd.), which were subjected to water removal, were added together to a mixing bowl, 0.80 g of N,N-bis(2-hydroxypropyl)aniline was added as a cross-linker, 0.02 g of bismuth 2-ethylhexanoate was added as a catalyst, and these materials were mixed at 2000 rpm for 10 min in a defoamer to obtain a mixture. 10 parts by weight of the mixture and 90 parts by weight of the solvent-free mixture obtained in step (2) were mixed at 2000 rpm for 10 min in the defoamer. A reaction was performed after standing at 40° C. for 30 h until the adhesive was cured, and the obtained product was ground into fine powder with a mortar to obtain the natural graphite anode material with a surface joined to an adhesive.

Example 47

This example provides a natural graphite anode material with a surface joined to an adhesive, and a preparation method therefor includes the steps below.

(1) An aqueous solution (800.0 g) where 5.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 80.0 g of methyl acrylate, 10.0 g of acrylamide monomer, 5.0 g of acrylonitrile, and 10.0 g of styrene were added, and 0.5 g of azobisisobutyronitrile (AIBN) was added as an initiator, continuously stirred and continuously introduced with nitrogen, the solution was heated to 75° C., the first polymerization reaction was performed for 8 h to obtain a polymerization product, the polymerization product was depressurized with a vacuum pump to a vacuum degree lower than 0.1 MPa, and residual unreacted monomer components were removed to obtain a first adhesive.

(2) 93 parts by weight of the natural graphite anode material (CONE-P from Zhejiang Carbon One), 3 parts by weight of the first adhesive, and 4 parts by weight of conductive carbon black were added to a metered amount of deionized water to prepare a dispersion slurry with a solid content of 40%, and the dispersion slurry was mixed with a disperser at 800 rpm for 30 s and 2000 rpm for 10 min to disperse the slurry uniformly. The dispersed slurry was vacuum-dried at room temperature to remove the solvent water to obtain a solvent-free mixture.

(3) 5.50 g of 1,5-naphthalene diisocyanate and 3.50 g of a hydroxyl-terminated acrylate polymer (UT-1001 from Soken Chemical & Engineering Co., Ltd.), which were subjected to water removal, were added together to a mixing bowl, 0.40 g of triethanolamine was added as a cross-linker, 0.01 g of bismuth 2-ethylhexanoate was added as a catalyst, and these materials were mixed at 2000 rpm for 10 min in a defoamer to obtain a mixture. 8 parts by weight of the mixture and 92 parts by weight of the solvent-free mixture obtained in step (2) were mixed at 2000 rpm for 10 min in the defoamer. A reaction was performed after standing at 100° C. for 5 h until the adhesive was cured, and the obtained product was ground into fine powder with a mortar to obtain the natural graphite anode material with a surface joined to an adhesive.

Example 48

This example differs from Example 42 only in that step (1) was performed as follows:

(1) An aqueous solution (800.0 g) where 5.0 g of polyvinyl alcohol (PVA) was dispersed was placed in a 2000 L reaction kettle, in a state of stirring at a rotational speed of 250 rpm, nitrogen with a purity of ≥99.9% was introduced, monomers of a first polymerization reaction including 90.0 g of methyl acrylate, 20.0 g of acrylamide monomer, and 10.0 g of acrylonitrile were added, 0.5 g of hydroxypropyl cellulose was added, and 0.5 g of azobisisobutyronitrile (AIBN) was added as an initiator, continuously stirred and continuously introduced with nitrogen, the solution was heated to 75° C., the first polymerization reaction was performed for 10 h to obtain a polymerization product, the polymerization product was depressurized with a vacuum pump to a vacuum degree lower than 0.1 MPa, and residual unreacted monomer components were removed to obtain a first adhesive. Other steps were the same as those in Example 42.

Example 49

This example differs from Example 48 only in that 6 g of hydroxypropyl cellulose was used.

Example 50

This example differs from Example 42 only in that the monomers of the first polymerization reaction in step (1) included only 99 g of methyl acrylate and 21 g of acrylamide monomer.

Example 51

This example differs from Example 42 only in that the monomers of the first polymerization reaction in step (1) included only 108 g of methyl acrylate and 12 g of acrylonitrile.

Example 52

This example differs from Example 43 only in that the monomers of the first polymerization reaction in step (1) included only 75 g of methyl acrylate and 15 g of styrene.

Example 53

This example differs from Example 42 only in that the monomers of the first polymerization reaction in step (1) included only 120 g of methyl acrylate.

Example 54

This example differs from Example 42 only in that the monomers of the first polymerization reaction in step (1) included only 120 g of acrylamide monomer.

Example 55

This example differs from Example 43 only in that the monomers of the first polymerization reaction in step (1) included only 90 g of styrene.

Example 56

This example differs from Example 42 only in that the monomers of the first polymerization reaction in step (1) included only 120 g of acrylonitrile.

Comparative Example 12

This comparative example differs from Example 42 only in that the hydroxyl-terminated acrylate polymer in step (3) was replaced with a polyester polyol (a polyester polyol from Pasto).

Comparative Example 13

This comparative example differs from Example 42 only in that the hydroxyl-terminated acrylate polymer in step (3) was replaced with a hydroxyl-terminated ethylene oxide polymer (TT310 from Tiantai Chemical).

Comparative Example 14

This comparative example differs from Example 42 only in that in-situ polymerization in step (3) was not performed, and the solvent-free mixture obtained in step (2) was directly used as the natural graphite anode material with a surface joined to an adhesive.

Comparative Example 15

This comparative example provides a modified natural graphite anode material, and a preparation method therefor includes the steps below.

5.00 g of hexamethylene diisocyanate and 4.00 g of a hydroxyl-terminated acrylate polymer (UT-1001 from Soken Chemical & Engineering Co., Ltd.), which were subjected to water removal, were added together to a mixing bowl, 0.30 g of 1,4-butanediol was added as a cross-linker, 0.01 g of dibutyltin dilaurate was added as a catalyst, and these materials were mixed at 2000 rpm for 10 min in a defoamer to obtain a mixture. 1 part by weight of the mixture and 99 parts by weight of a natural graphite anode material were mixed at 2000 rpm for 10 min in the defoamer. An in-situ polymerization reaction was performed after standing at normal temperature for 12 h until an adhesive was cured, and the obtained product was ground into fine powder with a mortar to obtain the modified natural graphite anode material.

Application Examples 42 to 56 and Comparative Application Examples 12 to 15

The natural graphite anode materials prepared above were prepared into anode sheets. Specifically, the natural graphite anode materials obtained in Examples 42 to 56 and Comparative Examples 12 to 15 were each mixed with a conductive agent carbon black (Surper P) and an adhesive PAA at a mass ratio of 96.5:1.5:2.0 to obtain a slurry, and the slurry was coated on a copper foil to form an anode sheet.

The prepared anode sheet and a lithium metal electrode sheet were assembled into a lithium-ion button battery.

$LiPF_6$ was dissolved at a concentration of 1 mol/L in an electrolyte containing ethylene carbonate/diethyl carbonate/ethyl methyl carbonate=2:3:1. After the button battery was assembled, initial coulombic efficiency and cycles were tested according to the following steps: standing for 2 h; constant current discharging at 0.10 C to 0.005 V, at 0.08 C to 0.001 V, at 0.05 C to 0.001 V, and at 0.02 C to 0.001 V; standing for 10 min; constant current charging at 0.10 C to 1.500 V.

The test results of the initial coulombic efficiency and the cycles are shown in Table 4.

TABLE 4

| Name | Ratio of the Slurry of the Anode Sheet | Initial coulombic efficiency (%) | Capacity Retention Rate After 1000 Cycles (%) |
|---|---|---|---|
| Application Example 42 | Natural graphite anode material:SP:adhesive = 96.5:1.5:2.0 | 94.1 | 88.5 |
| Application Example 43 | Natural graphite anode material:SP:adhesive = 96.5:1.5:2.0 | 94.2 | 88.6 |
| Application Example 44 | Natural graphite anode material:SP:adhesive = 96.5:1.5:2.0 | 94.5 | 88.0 |
| Application Example 45 | Natural graphite anode material:SP:adhesive = 96.5:1.5:2.0 | 94.7 | 88.4 |
| Application Example 46 | Natural graphite anode material:SP:adhesive = 96.5:1.5:2.0 | 94.6 | 88.5 |
| Application Example 47 | Natural graphite anode material:SP:adhesive = 96.5:1.5:2.0 | 94.1 | 87.9 |
| Application Example 48 | Natural graphite anode material:SP:adhesive = 96.5:1.5:2.0 | 94.8 | 89.1 |
| Application Example 49 | Natural graphite anode material:SP:adhesive = 96.5:1.5:2.0 | 94.2 | 89.5 |
| Application Example 50 | Natural graphite anode material:SP:adhesive = 96.5:1.5:2.0 | 93.9 | 88.0 |
| Application Example 51 | Natural graphite anode material:SP:adhesive = 96.5:1.5:2.0 | 94.3 | 88.3 |
| Application Example 52 | Natural graphite anode material:SP:adhesive = 96.5:1.5:2.0 | 94.5 | 88.3 |
| Application Example 53 | Natural graphite anode material:SP:adhesive = 96.5:1.5:2.0 | 94.7 | 87.1 |
| Application Example 54 | Natural graphite anode material:SP:adhesive = 96.5:1.5:2.0 | 94.0 | 87.4 |
| Application Example 55 | Natural graphite anode material:SP:adhesive = 96.5:1.5:2.0 | 94.3 | 87.9 |
| Application Example 56 | Natural graphite anode material:SP:adhesive = 96.5:1.5:2.0 | 94.5 | 86.1 |
| Comparative Application Example 12 | Natural graphite anode material:SP:adhesive = 96.5:1.5:2.0 | 93.1 | 81.2 |
| Comparative Application Example 13 | Natural graphite anode material:SP:adhesive = 96.5:1.5:2.0 | 93.0 | 80.4 |
| Comparative Application Example 14 | Natural graphite anode material:SP:adhesive = 96.5:1.5:2.0 | 93.2 | 80.5 |
| Comparative Application Example 15 | Natural graphite anode material:SP:adhesive = 96.5:1.5:2.0 | 93.2 | 81.0 |

As can be seen from the results in Table 4, the natural graphite anode material with a surface joined to an adhesive of the present application can cause the battery using the same to reach a initial coulombic efficiency of 94% or above and a capacity retention rate of 86% or above after 1000 cycles and have high battery efficiency and cycle stability.

In Comparative Example 12, the hydroxyl-terminated acrylate polymer was replaced with the polyester polyol in a second adhesive. Since the polyester polyol has a weaker force with the surface of natural graphite than the hydroxyl-terminated acrylate polymer, the battery has reduced initial coulombic efficiency and cycle stability.

In Comparative Example 13, the hydroxyl-terminated acrylate polymer was replaced with the hydroxyl-terminated ethylene oxide polymer in the second adhesive. Since the hydroxyl-terminated ethylene oxide polymer has a weaker force with the surface of natural graphite than the hydroxyl-terminated acrylate polymer, the battery has reduced initial coulombic efficiency and cycle stability.

In Comparative Example 14, since the in-situ polymerization in step (3) was not performed, the adhesive in the obtained natural graphite anode material with a surface joined to an adhesive includes only the first adhesive. In Comparative Example 15, the adhesive in the obtained natural graphite anode material with a surface joined to an adhesive includes only the second adhesive. Therefore, a good polymer coating network structure cannot be formed, and thus the batteries in Comparative Examples 14 and 15 have reduced initial coulombic efficiency and cycle stability.

The applicant has stated that although the natural graphite anode material with a surface joined to an adhesive, the preparation method therefor, and the use thereof in the present application are described through the preceding embodiments, the present application is not limited to the preceding embodiments, which means that the implementation of the present application does not necessarily depend on the preceding embodiments. It should be apparent to those skilled in the art that any improvements made to the present application, equivalent replacements of raw materials of the product of the present application, additions of adjuvant ingredients, selections of specific manners, etc., all fall within the protection scope and the disclosure scope of the present application.

What is claimed is:

1. An anode material with a surface joined to an adhesive, comprising the anode material and the adhesive joined to the surface of the anode material, wherein the adhesive comprises a first polymer and a second polymer, polymerized monomers of the first polymer comprise any one or a combination of at least two of an acrylate monomer, an acrylamide monomer, an acrylonitrile monomer, or a styrene monomer, the second polymer is a two-component polymer formed by an isocyanate monomer and any one of hydroxyl-terminated butadiene-acrylonitrile rubber, a hydroxyl-terminated ethylene oxide polymer, a polyol polymer, or a hydroxyl-terminated acrylate polymer, and the anode material comprises any one of a silicon-carbon anode material, a silicon-oxygen anode material, an artificial graphite anode material, or a natural graphite anode material;

wherein the isocyanate monomer is selected from any one or a combination of at least two of toluene diisocyanate, diphenylmethane diisocyanate, 1,5-naphthalene diisocyanate, dimethylbiphenyl diisocyanate, hexamethylene diisocyanate, hexamethylene diisocyanate biuret, hexamethylene diisocyanate trimer, 2,2,4-trimethylhexamethylene diisocyanate, xylylene diisocyanate, tetramethylxylylene diisocyanate, hydrogenated xylylene diisocyanate, isophorone diisocyanate, 4,4'-dicyclohexylmethane diisocyanate, methylcyclohexane diisocyanate, 1,4-cyclohexane diisocyanate, 1,4-phenylene diisocyanate, 1,3-phenylene diisocyanate, or norbornane diisocyanate.

2. The anode material with a surface joined to an adhesive according to claim 1, wherein the first polymer has a particle structure, the second polymer has a non-particle structure, and the first polymer and the second polymer form a polymer network on the surface of the anode material.

3. The anode material with a surface joined to an adhesive according to claim 1, wherein the silicon-carbon anode material is selected from a silicon-carbon composite material based on a silicon-based material, wherein the silicon-based material is nano silicon, micro silicon, porous silicon, amorphous silicon, or silicon monoxide; and the silicon-oxygen anode material is a silicon-based oxide anode material $SiO_x$, wherein x is 0-2 excluding 0;

optionally, the silicon-carbon anode material is selected from a silyl/graphite composite anode material;

optionally, the silicon-carbon anode material is selected from a material prepared by compounding a Si—C composite material with natural graphite or artificial graphite.

4. The anode material with a surface joined to an adhesive according to claim 1, wherein the adhesive further comprises cellulose mixed with the first polymer;

optionally, the cellulose is selected from any one or a combination of at least two of cellulose acetate, methyl cellulose, ethyl cellulose, hydroxypropyl cellulose, hydroxyethyl cellulose, cellulose nitrate, carboxymethyl cellulose, carboxyethyl cellulose, carboxypropyl cellulose, carboxyisopropyl cellulose, sodium cellulose, sodium cellulose nitrate, or sodium carboxyalkyl cellulose.

5. The anode material with a surface joined to an adhesive according to claim 1, wherein the hydroxyl-terminated ethylene oxide polymer is a liquid hydroxyl-terminated ethylene oxide polymer, the polyol polymer is a liquid polyol polymer, and the hydroxyl-terminated acrylate polymer is a liquid hydroxyl-terminated acrylate polymer;

optionally, the hydroxyl-terminated ethylene oxide polymer has a number average molecular weight of 100-10000.

6. The anode material with a surface joined to an adhesive according to claim 1, wherein a glass transition temperature Tg of the first polymer ranges from −50° C. to 200° C.;

optionally, the first polymer has a particle size of 200 nm to 10 μm;

optionally, the first polymer is polymerized by a method of emulsion polymerization, microemulsion polymerization, suspension polymerization, or microsuspension polymerization;

optionally, the second polymer is obtained through in-situ polymerization on the surface of the anode material joined to the first polymer.

7. A preparation method for the anode material with a surface joined to an adhesive according to claim 1, comprising:

(1) adding a first polymer and the anode material to a solvent, performing wet mixing to obtain a mixed slurry, and removing the solvent from the mixed slurry to obtain a solvent-free mixture; and (2) mixing any one of hydroxyl-terminated butadiene-acrylonitrile rubber, a hydroxyl-terminated ethylene oxide polymer, a polyol polymer, or a hydroxyl-terminated acrylate polymer, an isocyanate monomer, a cross-linker, and a catalyst, mixing the solvent-free mixture obtained in step (1), and performing an in-situ polymerization reaction to obtain the anode material with a surface joined to an adhesive.

8. The preparation method according to claim 7, wherein a preparation method for the first polymer in step (1) comprises:

adding polymerizable monomers of the first polymer and an initiator to an aqueous solution containing an emulsifier and/or a dispersant, performing a first polymerization reaction to obtain a first polymer emulsion, and removing the solvent water to obtain the first polymer, wherein the polymerizable monomers of the first polymer comprise any one or a combination of at least two of an acrylate monomer, an acrylamide monomer, an acrylonitrile monomer, or a styrene monomer;

wherein when the anode material is a silicon-carbon anode material or a silicon-oxygen anode material, with a total weight of the emulsifier, the dispersant, the polymerizable monomers of the first polymer, and the initiator as 100%, a total proportion of the dispersant and the emulsifier is 0.1%-20.0%, a proportion of the polymerizable monomers of the first polymer is 60.0%-99.8%, and a proportion of the initiator is 0.1%-20.0%;

when the anode material is an artificial graphite anode material or a natural graphite anode material, with the total weight of the emulsifier, the dispersant, the polymerizable monomers of the first polymer, and the initiator as 100%, the total proportion of the dispersant and the emulsifier is 0.1%-10.0%, the proportion of the polymerizable monomers of the first polymer is 80.0%-99.8%, and the proportion of the initiator is 0.1%-10.0%;

optionally, a total weight percentage of the emulsifier, the dispersant, the polymerizable monomers of the first polymer, and the initiator is 2%-30% of the first polymer emulsion;

optionally, the acrylate monomer is selected from any one or a combination of at least two of methyl acrylate, ethyl acrylate, butyl acrylate, isobutyl acrylate, n-pentyl acrylate, isopentyl acrylate, n-hexyl acrylate, isooctyl acrylate, hydroxypropyl acrylate, 2-hydroxyethyl acrylate, lauryl acrylate, methyl methacrylate, ethyl methacrylate, butyl methacrylate, isobutyl methacrylate, n-pentyl methacrylate, n-hexyl methacrylate, isooctyl methacrylate, hydroxypropyl methacrylate, 2-hydroxyethyl methacrylate, sodium acrylate, lithium acrylate, acrylic acid, lithium methacrylate, methacrylic acid, lithium itaconate, itaconic acid, lithium monobutyl itaconate, or monobutyl itaconate;

optionally, the acrylamide monomer is selected from any one or a combination of at least two of acrylamide, methacrylamide, N-hydroxymethylacrylamide, or N,N-dimethylacrylamide;

optionally, the emulsifier is one or a combination of at least two of sodium dodecyl sulfate, sodium dodecyl benzenesulfonate, or sodium dodecyl sulfonate;

optionally, the dispersant is one or a combination of at least two of polyvinyl alcohol, polyvinylpyrrolidone, tetradecane, hexadecane, or octadecane;

optionally, the initiator is independently an organic peroxide initiator, an organic azo initiator, an inorganic peroxide initiator, or a redox initiator;

optionally, the organic peroxide initiator is benzoyl peroxide or dicumyl peroxide;

optionally, the organic azo initiator is azobisisobutyronitrile or azobisisoheptanonitrile;

optionally, the inorganic peroxide initiator is ammonium persulfate, sodium persulfate, or potassium persulfate;

optionally, the redox initiator is ammonium persulfate and sodium sulfite, or ammonium persulfate and sodium bisulfite;

optionally, the first polymerization reaction is performed at a temperature of 35-98° C.;

optionally, the first polymerization reaction is performed for 3-15 h.

9. The preparation method according to claim 7, wherein with a total weight of a first adhesive and the anode material in the mixed slurry in step (1) as 100%, a proportion of the first adhesive is 0.5-10.0% and a proportion of the anode material is 90.0-99.5%;

optionally, the mixed slurry in step (1) further comprises a conductive additive;

optionally, the conductive additive comprises one or a combination of at least two of conductive graphite, carbon nanotubes, or conductive carbon black;

optionally, with the total weight of the first adhesive and the anode material in the mixed slurry in step (1) as 100%, a proportion of the conductive additive is 0-5%;

optionally, a process of the wet mixing in step (1) comprises a resonant sound mixing process, a high shear process, and a grinding process;

optionally, the wet mixing in step (1) is performed by one or a combination of at least two of a ball mill, a disc mill, a pin grinder, a high energy impact grinder, a fluid energy impact grinder, a counter-jet grinder, a fluidized-bed jet grinder, or a hammer grinder;

optionally, a method for removing the solvent from the mixed slurry in step (1) is any one or a combination of at least two of vacuum drying, centrifugation, freeze drying, or spray drying.

10. The preparation method according to claim 7, wherein when the anode material is any one of the silicon-oxygen anode material, the artificial graphite anode material, or the natural graphite anode material, cellulose is further added to a system of the first polymerization reaction;

optionally, the cellulose is selected from any one or a combination of at least two of cellulose acetate, methyl cellulose, ethyl cellulose, hydroxypropyl cellulose, hydroxyethyl cellulose, cellulose nitrate, carboxymethyl cellulose, carboxyethyl cellulose, carboxypropyl cellulose, carboxyisopropyl cellulose, sodium cellulose, sodium cellulose nitrate, or sodium carboxyalkyl cellulose;

optionally, the cellulose is used in an amount of 0.1%-5.0% of a total weight of the polymerizable monomers of the first polymer.

11. The preparation method according to claim 7, wherein a total weight of the isocyanate monomer and any one of the hydroxyl-terminated butadiene-acrylonitrile rubber, the hydroxyl-terminated ethylene oxide polymer, the polyol polymer, or the hydroxyl-terminated acrylate polymer in step (2) is 0.1-10.0% of a weight of the solvent-free mixture;

optionally, a weight ratio of the isocyanate monomer to any one of the hydroxyl-terminated butadiene-acrylonitrile rubber, the hydroxyl-terminated ethylene oxide polymer, the polyol polymer, or the hydroxyl-terminated acrylate polymer in step (2) is 1:2-5:1;

optionally, in step (2), the cross-linker is used in an amount of 0.1%-10.0% of the total weight of the isocyanate monomer and any one of the hydroxyl-terminated butadiene-acrylonitrile rubber, the hydroxyl-terminated ethylene oxide polymer, the polyol polymer, or the hydroxyl-terminated acrylate polymer;

optionally, in step (2), the catalyst is used in an amount of 0.1%-5.0% of the total weight of the isocyanate monomer and any one of the hydroxyl-terminated butadiene-acrylonitrile rubber, the hydroxyl-terminated ethylene oxide polymer, the polyol polymer, or the hydroxyl-terminated acrylate polymer;

optionally, the isocyanate monomer in step (2) is selected from any one or a combination of at least two of toluene diisocyanate, diphenylmethane diisocyanate, 1,5-naphthalene diisocyanate, dimethylbiphenyl diisocyanate, hexamethylene diisocyanate, hexamethylene diisocyanate biuret, hexamethylene diisocyanate trimer, 2,2,4-trimethylhexamethylene diisocyanate, xylylene diisocyanate, tetramethylxylylene diisocyanate, hydrogenated xylylene diisocyanate, isophorone diisocyanate, 4,4'-dicyclohexylmethane diisocyanate, methylcyclohexane diisocyanate, 1,4-cyclohexane diisocyanate, 1,4-phenylene diisocyanate, 1,3-phenylene diisocyanate, or norbornane diisocyanate;

optionally, the cross-linker in step (2) is selected from any one or a combination of at least two of a diol cross-linker, a triol cross-linker, a diamine cross-linker, an alcoholamine cross-linker, an alicyclic alcohol cross-linker, an aromatic alcohol cross-linker, glycerol allyl ether, glycidyl allyl ether, or dicumyl peroxide;

optionally, the cross-linker in step (2) is selected from any one or a combination of at least two of 1,4-butanediol, ethylene glycol, propylene glycol, diethylene glycol, neopentyl glycol, glycerol, trimethylolpropane, 3,3-dichloro-4,4-diaminodiphenylmethane, 3,5-dimethylthiotoluenediamine, 3,5-diethyltoluenediamine, 2,4-diamino-3,5-dimethylthiochlorobenzene, isophorone diamine, ethanolamine, diethanolamine, triethanolamine, N,N-bis(2-hydroxypropyl)aniline, 1,4-cyclohexanediol, hydrogenated bisphenol A, dimethylene phenyl glycol, hydroquinone bis-β-hydroxyethyl ether, resorcinol hydroxy ether, glycerol allyl ether, glycidyl allyl ether, or dicumyl peroxide;

optionally, in step (2), the hydroxyl-terminated ethylene oxide polymer is a liquid hydroxyl-terminated ethylene oxide polymer, the polyol polymer is a liquid polyol polymer, and the hydroxyl-terminated acrylate polymer is a liquid hydroxyl-terminated acrylate polymer;

optionally, the hydroxyl-terminated ethylene oxide polymer has a number average molecular weight of 100-10000;

optionally, the polyol polymer has a number average molecular weight of 100-10000;

optionally, the polyol polymer is selected from any one or a combination of at least two of a polyester polyol, a polyether polyol, or a polycarbonate polyol;

optionally, the hydroxyl-terminated acrylate polymer has a number average molecular weight of 100-10000;

optionally, polymerizable monomers of the hydroxyl-terminated acrylate polymer comprise any one or a combination of at least two of styrene, acrylic acid, butyl acrylate, butyl methacrylate, hydroxyethyl methacrylate, hydroxyethyl acrylate, hydroxypropyl methacrylate, or hydroxypropyl acrylate;

optionally, the catalyst in step (2) is selected from any one or a combination of at least two of a tertiary amine catalyst or an organic metal compound;

optionally, the catalyst in step (2) is selected from any one or a combination of at least two of N,N-dimethylcyclohexylamine, dibutyltin dilaurate, bismuth 2-ethylhexanoate, or bismuth neodecanoate;

optionally, the in-situ polymerization reaction in step (2) is performed at a temperature of 25-100° C.;

optionally, the in-situ polymerization reaction in step (2) is performed for 5-50 h.

12. An anode sheet, comprising the anode material with a surface joined to an adhesive according to claim 1.

13. An electrochemical energy storage device, comprising the anode material with a surface joined to an adhesive according to claim 1;

optionally, the electrochemical energy storage device is selected from one of a lithium-ion battery, a sodium-ion battery, a supercapacitor, a fuel cell, or a solar cell.

14. The anode material with a surface joined to an adhesive according to claim 1, wherein the acrylate monomer is selected from any one or a combination of at least two of methyl acrylate, ethyl acrylate, butyl acrylate, isobutyl acrylate, n-pentyl acrylate, isopentyl acrylate, n-hexyl acrylate, isooctyl acrylate, hydroxypropyl acrylate, 2-hydroxyethyl acrylate, lauryl acrylate, methyl methacrylate, ethyl methacrylate, butyl methacrylate, isobutyl methacrylate, n-pentyl methacrylate, n-hexyl methacrylate, isooctyl methacrylate, hydroxypropyl methacrylate, 2-hydroxyethyl methacrylate, sodium acrylate, lithium acrylate, acrylic acid, lithium methacrylate, methacrylic acid, lithium itaconate, itaconic acid, lithium monobutyl itaconate, or monobutyl itaconate;

optionally, the acrylamide monomer is selected from any one or a combination of at least two of acrylamide, methacrylamide, N-hydroxymethylacrylamide, or N,N-dimethylacrylamide.

15. The anode material with a surface joined to an adhesive according to claim 1, wherein raw materials for preparing the second polymer further comprise a cross-linker and/or a catalyst.

16. The anode material with a surface joined to an adhesive according to claim 15, wherein the cross-linker is selected from any one or a combination of at least two of a diol cross-linker, a triol cross-linker, a diamine cross-linker, an alcoholamine cross-linker, an alicyclic alcohol cross-linker, an aromatic alcohol cross-linker, glycerol allyl ether, glycidyl allyl ether, or dicumyl peroxide;

optionally, the cross-linker is selected from any one or a combination of at least two of 1,4-butanediol, ethylene glycol, propylene glycol, diethylene glycol, neopentyl glycol, glycerol, trimethylolpropane, 3,3-dichloro-4,4-diaminodiphenylmethane, 3,5-dimethylthiotoluenediamine, 3,5-diethyltoluenediamine, 2,4-diamino-3,5-dimethylthiochlorobenzene, isophorone diamine, ethanolamine, diethanolamine, triethanolamine, N,N-bis(2-hydroxypropyl)aniline, 1,4-cyclohexanediol, hydrogenated bisphenol A, dimethylene phenyl glycol, hydroquinone bis-p-hydroxyethyl ether, resorcinol hydroxy ether, glycerol allyl ether, glycidyl allyl ether, or dicumyl peroxide.

17. The anode material with a surface joined to an adhesive according to claim 15, wherein the catalyst is selected from any one or a combination of at least two of a tertiary amine catalyst or an organic metal compound;

optionally, the catalyst is selected from any one or a combination of at least two of N,N-dimethylcyclohexylamine, dibutyltin dilaurate, bismuth 2-ethylhexanoate, or bismuth neodecanoate.

18. The anode material with a surface joined to an adhesive according to claim 1, wherein the polyol polymer has a number average molecular weight of 100-10000;

optionally, the polyol polymer is selected from any one or a combination of at least two of a polyester polyol, a polyether polyol, or a polycarbonate polyol.

19. The anode material with a surface joined to an adhesive according to claim 1, wherein the hydroxyl-terminated acrylate polymer has a number average molecular weight of 100-10000;

optionally, polymerized monomers of the hydroxyl-terminated acrylate polymer comprise any one or a combination of at least two of acrylic acid, butyl acrylate, butyl methacrylate, hydroxyethyl methacrylate, hydroxyethyl acrylate, hydroxypropyl methacrylate, or hydroxypropyl acrylate.

* * * * *